US010861495B1

(12) United States Patent
Shuck

(10) Patent No.: US 10,861,495 B1
(45) Date of Patent: Dec. 8, 2020

(54) METHODS AND SYSTEMS FOR CAPTURING AND TRANSMITTING MEDIA

(71) Applicant: Joshua P. Shuck, Ponte Vedra, FL (US)

(72) Inventor: Joshua P. Shuck, Ponte Vedra, FL (US)

(*) Notice: Subject to any disclaimer, the term of this patent is extended or adjusted under 35 U.S.C. 154(b) by 0 days.

(21) Appl. No.: 16/895,287

(22) Filed: Jun. 8, 2020

(51) Int. Cl.
| | |
|---|---|
| *H04N 9/80* | (2006.01) |
| *G11B 20/00* | (2006.01) |
| *H04N 5/232* | (2006.01) |
| *G06F 9/451* | (2018.01) |
| *G06Q 40/08* | (2012.01) |
| *G06F 16/438* | (2019.01) |
| *G06Q 10/10* | (2012.01) |
| *H04N 5/93* | (2006.01) |

(52) U.S. Cl.
CPC ........ *G11B 20/00681* (2013.01); *G06F 9/451* (2018.02); *G06F 16/438* (2019.01); *G06Q 10/107* (2013.01); *G06Q 40/08* (2013.01); *G11B 20/00862* (2013.01); *H04N 5/23222* (2013.01)

(58) Field of Classification Search
CPC ....... H04L 65/605; H04L 65/60; H04L 67/06; H04N 21/2743; H04N 21/4223
USPC ................ 386/248, 278, 239, 282, 290, 326
See application file for complete search history.

(56) References Cited

U.S. PATENT DOCUMENTS

| | | | | |
|---|---|---|---|---|
| 2013/0307956 A1* | 11/2013 | Hyde | ................ | G06Q 30/0241 348/78 |
| 2019/0221235 A1* | 7/2019 | Mclean | ............... | G06F 11/3438 |

* cited by examiner

*Primary Examiner* — Robert Chevalier
(74) *Attorney, Agent, or Firm* — Wilson Dutra, PLLC; Camille A. Wilson

(57) ABSTRACT

The present disclosure allows for unique collection and housing of captured media, and further provides for a unique method of access for stored captured media. In some implementations, the system may use a device's native components, such as a microphone or camera, without using the native operating system. In some embodiments, captured media may be temporarily stored in a local cache until the device connects to a communication network, which may initiate transfer of the captured media to an external server. In some implementations, captured media may be accessible through a unique access mechanism, which may allow for immediate viewing of the captured media without requiring a separate download of the file.

19 Claims, 18 Drawing Sheets

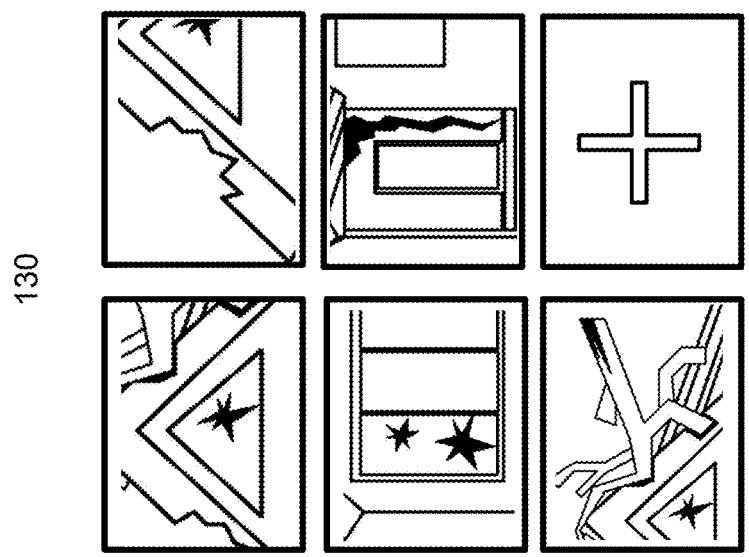
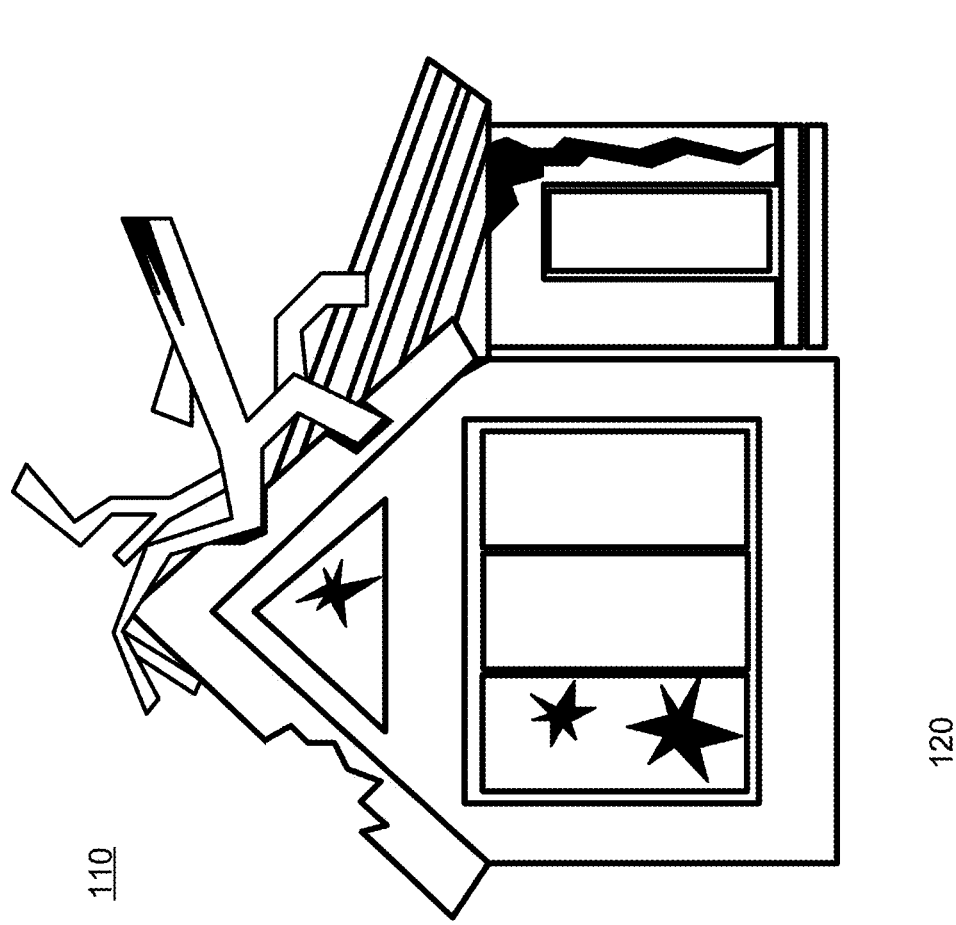
FIG. 1B

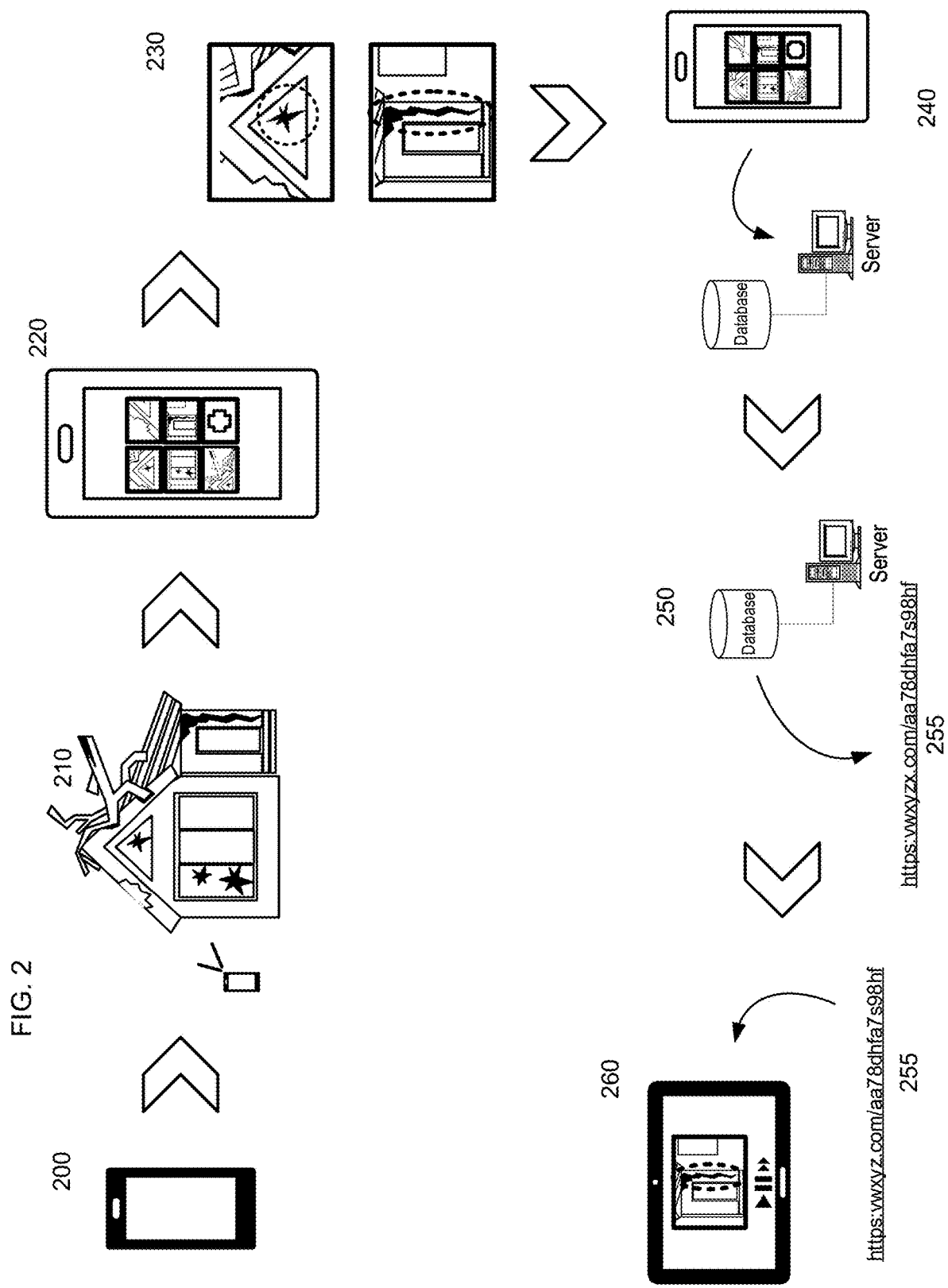

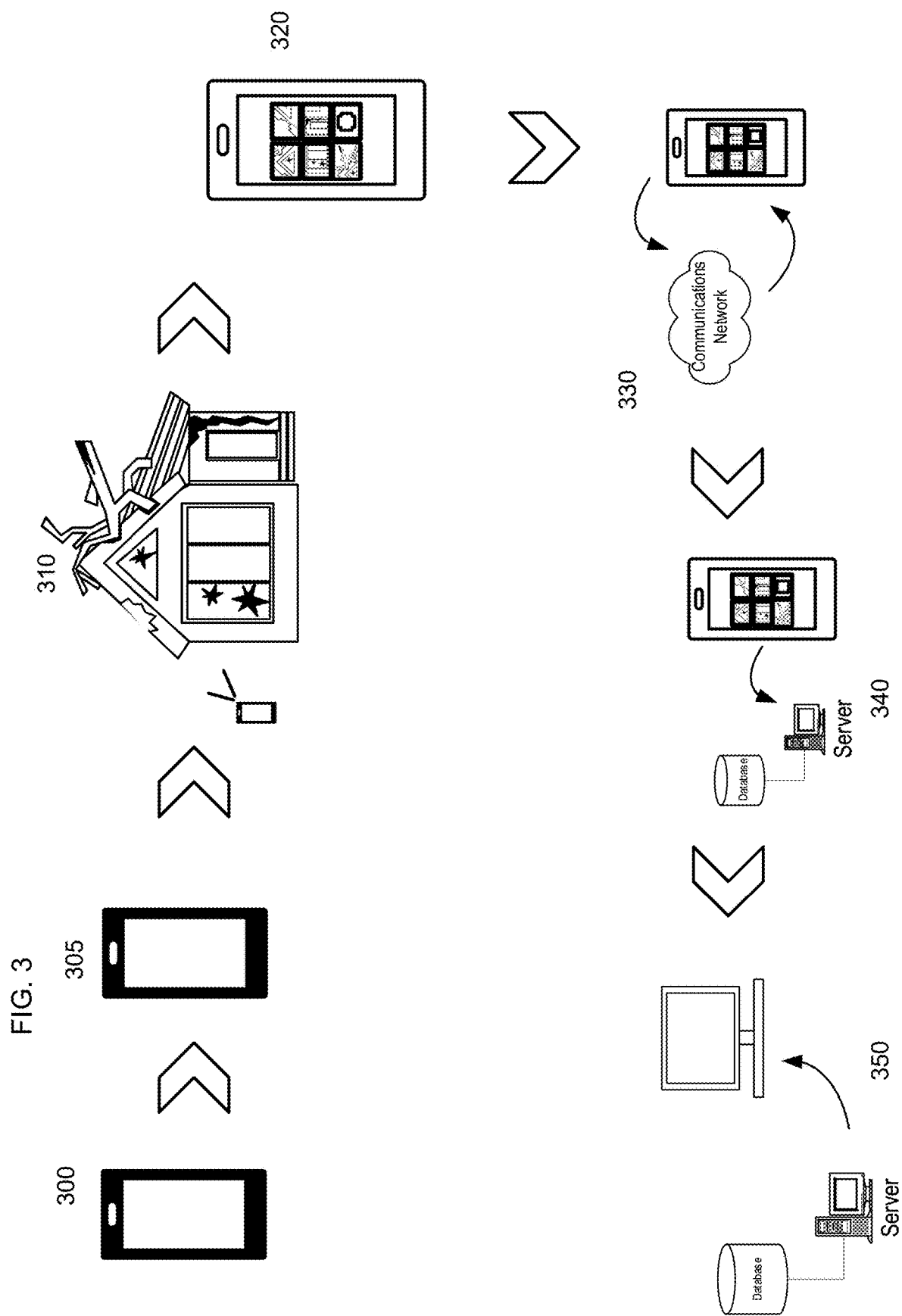

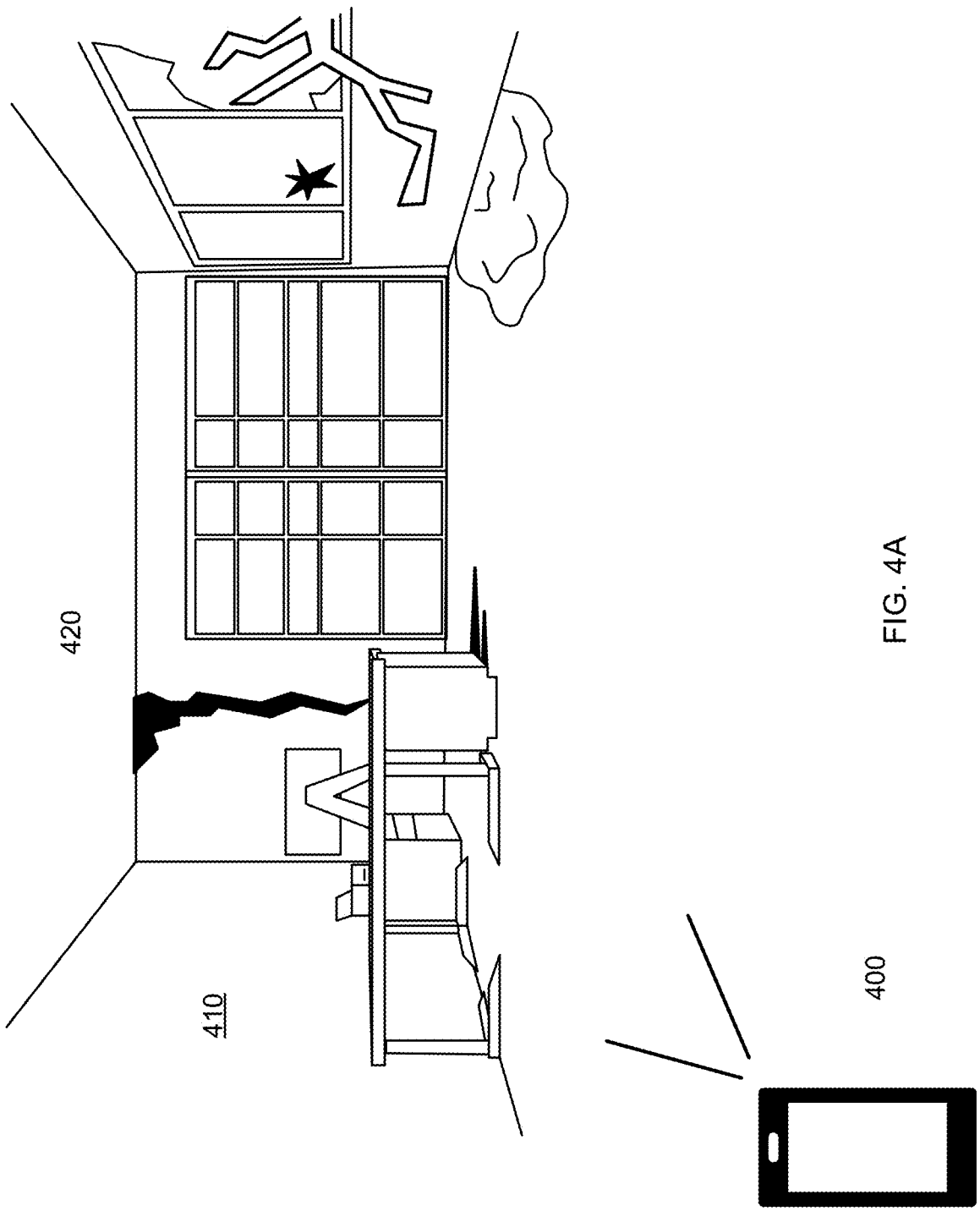

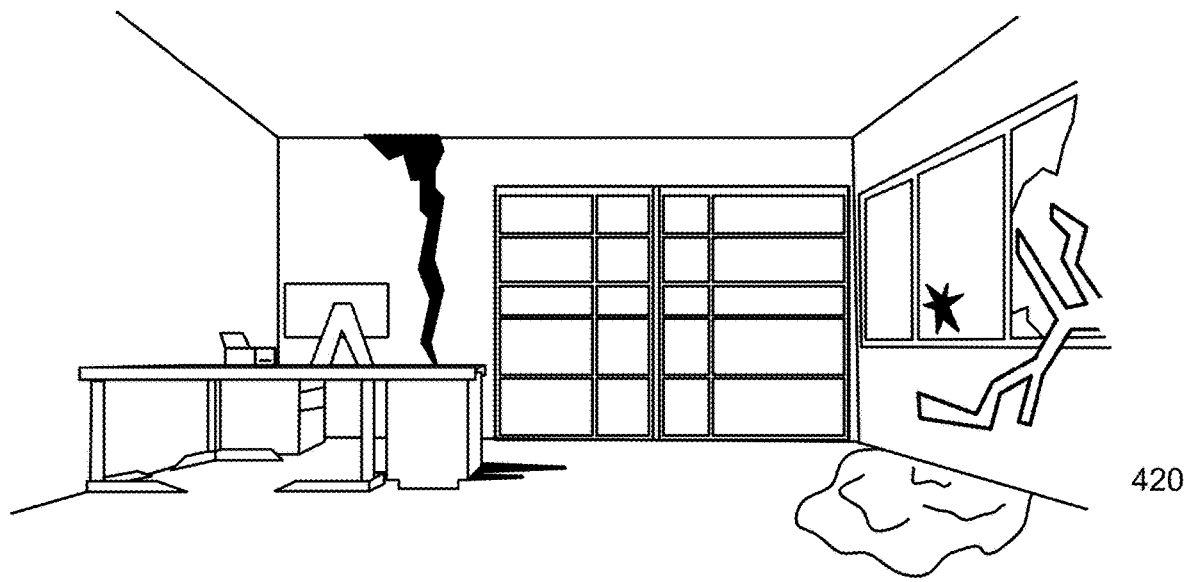
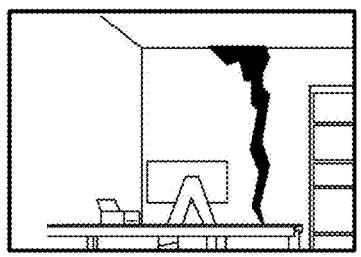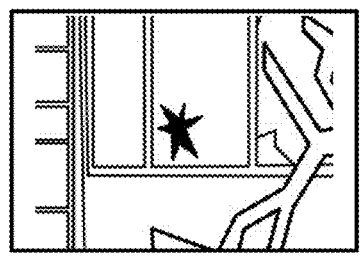
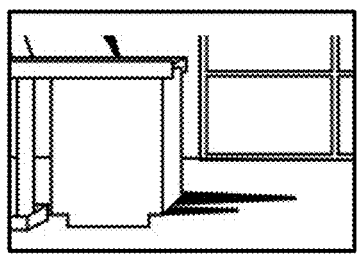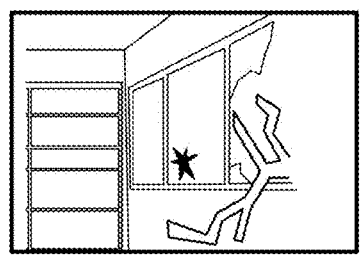
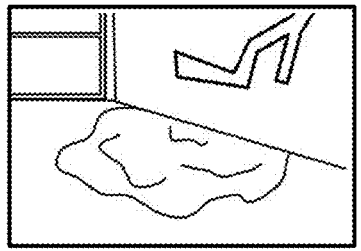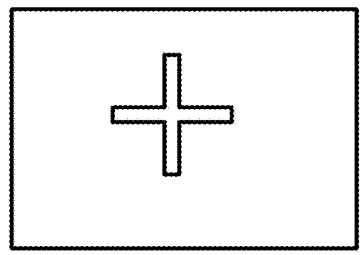
FIG. 4B

440

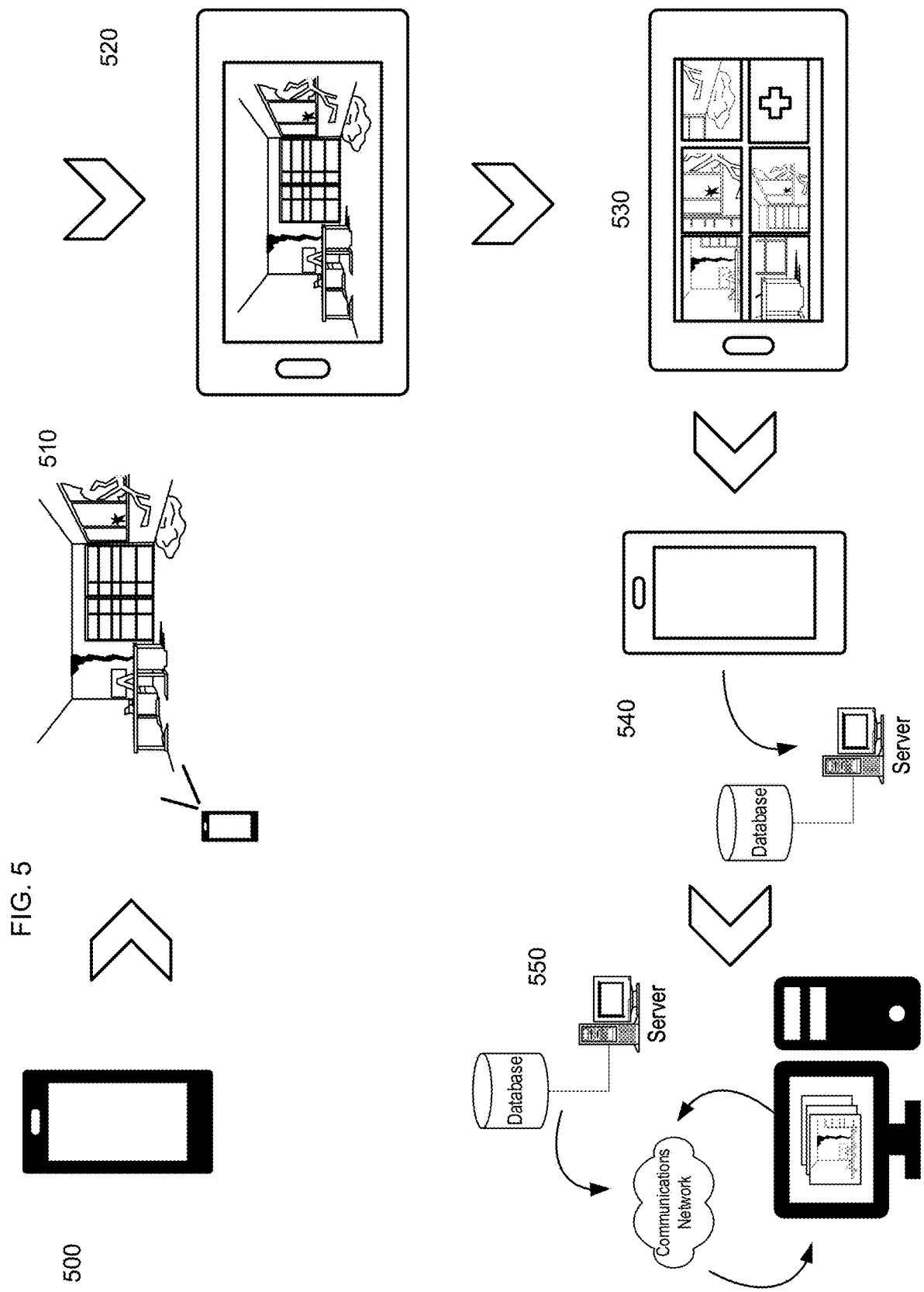

METHODS AND SYSTEMS FOR CAPTURING AND TRANSMITTING MEDIA

BACKGROUND

At the time of its introduction to the general public, the ability to capture photographs using a mobile phone was revolutionary. Adding the ability to send a captured image using the telephone feature on a mobile phone made it possible to share those captured photographs with other people. Over time, mobile phones improved in a variety of other ways, including the quality of the image that was captured as well as making it easier to send whatever was captured to other people.

The creation of the smartphone enabled mobile phones to integrate mobile applications into native components of the phone, allowing users to integrate features such as geotagging or image stitching. Mobile phones also improved their zoom capabilities as well as their native lighting options for people to capture images. Some camera phones started integrating optical image stabilization, multiple lens or multi-shot options, and larger sensors as part of the camera functionality.

As image capture functionality developed for mobile devices, the camera could also be used to capture video using the microphone in the phone in conjunction with the camera. As memory capacity increased, users could take longer videos and store them locally on their cameras. As technology advanced, users could create higher quality videos. Smartphones and mobile applications enabled users to edit or enhance the videos they captured. Communication advancements, such as messaging services, or storage capabilities, such as cloud storage, enabled users to send videos to others or to store videos to view later.

In step with the social uses for mobile devices and smart phones, this camera functionality had commercial benefits. For example, insurance companies had a vested interest in being able to properly capture and document reported conditions or incidents for their records. This would enhance the ability of an adjuster to assess damages and conclude what an insurance company could cover.

Despite this benefit, companies have to be careful with the footage that they capture. It could include sensitive, personal, or proprietary information that they might not want to share with others. Further, a company may need to restrict an employee's access to the captured data once it is captured or, alternatively, ensure that it is deposited or uploaded in the proper location. When video capture is involved, there is the added concern with storage of massive amounts of data as well as being able to easily access and reference prior stored information.

SUMMARY OF THE DISCLOSURE

What is needed is a system and method for sorting, organizing, and minimizing captured video footage. In some aspects, the present disclosure allows for unique collection and housing of captured media, and further provides for a unique method of access for stored captured media. In some embodiments, the system may store captured video footage in a segmented database. In some implementations, an authorized user may access captured video footage marked by the system. In some aspects, the system may categorize captured video footage based on location, time, or instance. In some embodiments, the system may limit the size of the captured file without reducing the quality of the captured footage. In some implementations, the system may use post-processing, either natively in the capturing device's hardware or in the cloud, to reduce the storage size of captured footage. In some aspects, the system may reduce the storage size of captured footage by setting limits on what may be captured or how long footage may be captured.

In some embodiments, the system may use a device's native components, such as a microphone or camera, without using the native operating system. In some aspects, the system may limit the length of time a user captures footage. In some implementations, the system may screenshot what the system or a user identifies as important footage while the footage is being captured. For example, a user may identify skid marks at the scene of a car accident when capturing footage and the system may screenshot the skid marks for review later. In some aspects, the system may capture audio along with visual footage. In some embodiments, the system may tag certain portions of the footage based on what a user is saying.

A system of one or more computers may be configured to perform particular operations or actions by virtue of having software, firmware, hardware, or a combination of them installed on the system that in operation causes or cause the system to perform the actions. One or more computer programs may be configured to perform particular operations or actions by virtue of including instructions that, when executed by data processing apparatus, cause the apparatus to perform the actions. One general aspect of the present disclosure may comprise a system for capturing and transmitting media comprising a portable device, a communications device, and an external server configured to receive and store captured media transmitted from the portable device, wherein the communication device monitors for communication access to the external server and transfers captured media to the external server, and wherein transferring captured media prompts deletion of captured media in the temporary cache.

In some embodiments, the portable device may comprise: a media capture component, wherein the media capture component is controllable by a native software stored on the portable device; a downloadable software to control the media capture component, wherein control of the media capture component circumvents the native software; a temporary cache, wherein captured media is temporarily stored in the temporary cache. Other embodiments of this aspect may include corresponding computer systems, apparatus, and computer programs recorded on one or more computer storage devices, each configured to perform the actions of the methods.

Implementations may comprise one or more of the following features. In some aspects, the media capture component may comprise a camera. In some embodiments, the downloadable software may comprise a user application may comprise a plurality of graphical user interfaces. In some implementations, control of the media capture component through the downloadable software may be temporary. In some embodiments, accessing the user application initiates control of the media capture component. In some aspects, the external server may further be configured to transmit an electronic communication that may comprise an access mechanism that allows for viewing of the at least a portion of captured media. In some embodiments, the access mechanism may be randomly generated. Implementations of the described techniques may include hardware, a method or process, or computer software on a computer-accessible medium.

One general aspect of the present disclosure may comprise a computer-implemented method for capturing and transmitting media. The computer-implemented method may comprise circumventing native instructions for a media capture component of a portable device, wherein native instructions are stored locally; controlling the media capture component, capturing media through the media capture component, storing media in a temporary cache in the portable device, monitoring for communication access to an external server, receiving communication access to the external server, transmitting media to the external server, and removing media from the temporary cache. Other embodiments of this aspect may include corresponding computer systems, apparatus, and computer programs recorded on one or more computer storage devices, each configured to perform the actions of the methods.

Implementations may comprise one or more of the following features. In some embodiments, the media capture component may comprise a camera. In some aspects, the temporary cache may be inaccessible to a user. In some implementations, the computer-implemented method may comprise a plurality of graphical user interfaces configured to receive media capture control prompts. In some aspects, at least a portion of the graphical user interfaces may comprise a captured media interface configured to present captured media. In some implementations, the computer-implemented method may comprise accessing local memory resources; and creating the temporary cache.

In some aspects, the computer-implemented method may comprise generating an access mechanism that provides access to view at least a portion of media; and transmitting an electronic communication may comprise the access mechanism. In some embodiments, the computer-implemented method may comprise receiving an access request; and providing access to a viewer interface may comprise a media player. Implementations of the described techniques may include hardware, a method or process, or computer software on a computer-accessible medium.

One general aspect of the present disclosure may comprise a computer-implemented method for providing access to captured media. The computer-implemented method may comprise accessing a captured media database; identifying one or more files storing captured media; generating an access mechanism for access to the captured media; transmitting the access mechanism; receiving an access prompt through the access mechanism; and providing an interface may comprise a viewer, wherein the viewer provides access to view captured media, wherein access to view captured media prohibits access to the one or more files. Other embodiments of this aspect may include corresponding computer systems, apparatus, and computer programs recorded on one or more computer storage devices, each configured to perform the actions of the methods.

Implementations may comprise one or more of the following features. In some aspects, the one or more files may comprise one or more tags, wherein providing an interface may comprise providing the one or more tags. In some embodiments, the access mechanism may comprise a randomly generated Uniform Resource Locator ("URL"). In some implementations, the access mechanism may be transmitted through a communication. In some aspects, the communication may comprise one or more a text, email, or push notification. Implementations of the described techniques may include hardware, a method or process, or computer software on a computer-accessible medium.

BRIEF DESCRIPTION OF THE DRAWINGS

The accompanying drawings that are incorporated in and constitute a part of this specification illustrate several embodiments of the disclosure and, together with the description, serve to explain the principles of the disclosure:

FIG. 1B illustrates a target with areas of interest and exemplary captured media, according to some embodiments of the present disclosure.

FIG. 2 illustrates exemplary process steps for capturing and transmitting media, according to some embodiments of the present disclosure.

FIG. 3 illustrates exemplary process steps for capturing and transmitting media, according to some embodiments of the present disclosure.

FIG. 4A illustrates a portable device capturing an exemplary target with areas of interest, according to some embodiments of the present disclosure.

FIG. 4B illustrates a target with areas of interest and exemplary captured media, according to some embodiments of the present disclosure.

FIG. 5 illustrates exemplary process steps for capturing and transmitting media, according to some embodiments of the present disclosure.

DETAILED DESCRIPTION

Figure 1A:
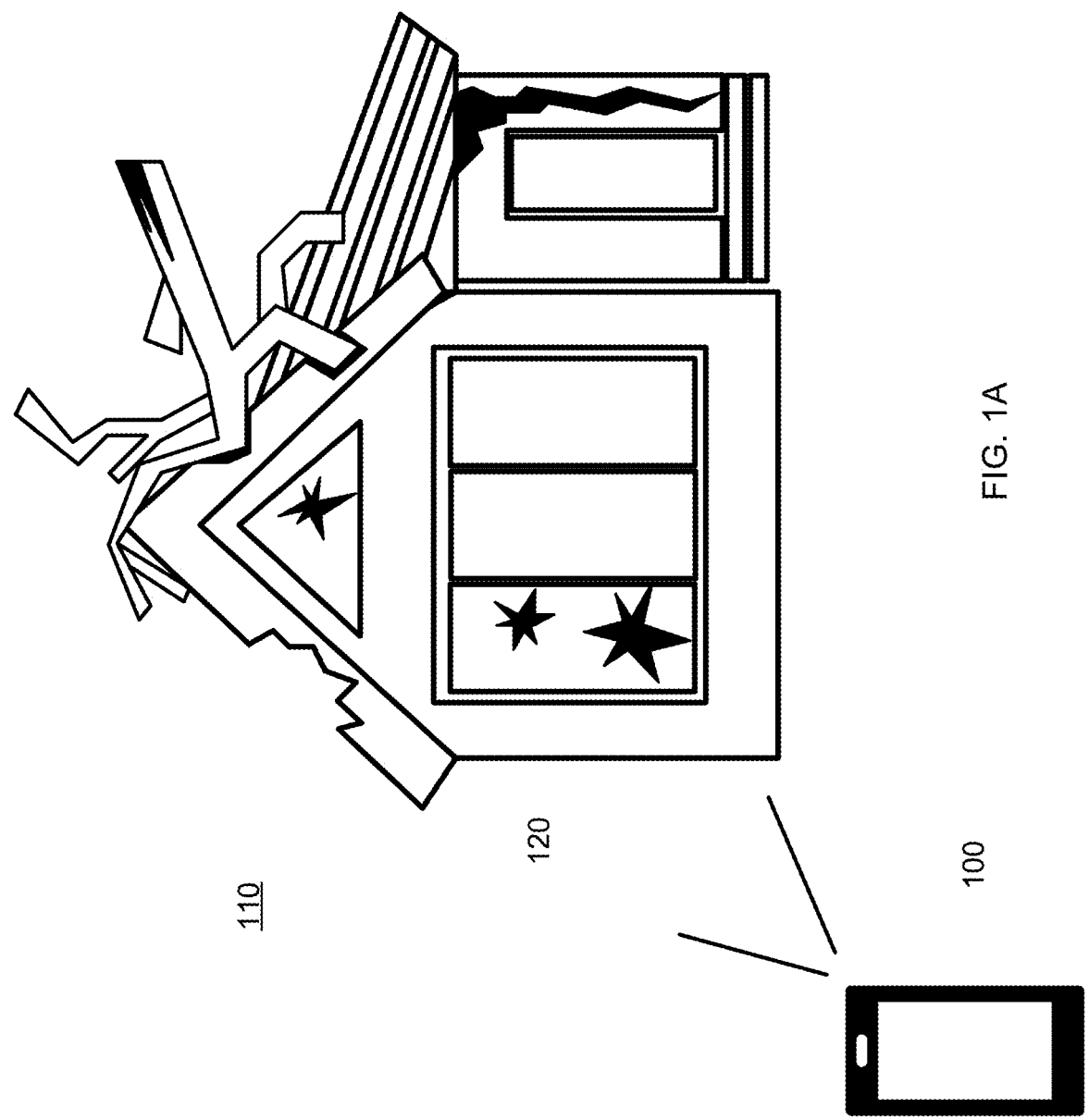
FIG. 1A illustrates a portable device capturing an exemplary target with areas of interest, according to some embodiments of the present disclosure.

The present disclosure provides generally for a system for capturing and transferring media through a portable device. More specifically, the present disclosure allows for unique collection and housing of captured media, and further provides for a unique method of access for stored captured media. In some implementations, the system may use a device's native components, such as a microphone or camera, without using the native operating system. In some embodiments, captured media may be temporarily stored in a local cache until the device connects to a communication network, which may initiate transfer of the captured media to an external server.

In some embodiments, the system may store captured video footage in a segmented database. In some implementations, an authorized user may access captured video footage marked by the system. In some aspects, the system may categorize captured video footage based on location, time, or instance. In some embodiments, the system may limit the size of the captured file without reducing the quality of the captured footage. In some implementations, the system may send and save media bites to the system and external servers creating unique access mechanisms, which may allow for easy access to the captured media.

In some aspects, the native software may not store the media on the portable device permanently, but only in an online temporary cache until moved to an external server where the media bites may be stored for longer periods. In some implementations, the media bites may not be accessible by the user on the portable device other than to delete unwanted media files that may not relate to the claims.

In some aspects, the media may be accessible with a unique access mechanism created by the system for each media bite. In some embodiments, the media may be accessed through an online web portal connected to the system and not independently downloaded, which may ensure that captured media may not be tampered with. In some implementations, captured media files may be tagged with unique identifiers that associate media files with certain projects, claims, clients, adjusters, companies, targets, services, or areas of interest, as non-limiting examples.

In some embodiments, a portable device may locally stores the media with limited accessibility. For example, access may be limited to confirming the captured media or deleting it with no editing capabilities. In some implementations, the media may contain receipts that may carry unique access mechanisms with them from the local device to the external servers that may allow for limited access to the media bites for viewers and users, such as third parties or employees.

In the following sections, detailed descriptions of examples and methods of the disclosure will be given. The description of both preferred and alternative examples, though thorough, are exemplary only, and it is understood to those skilled in the art that variations, modifications, and alterations may be apparent. It is therefore to be understood that the examples do not limit the broadness of the aspects of the underlying disclosure as defined by the claims. For illustrative purposes, the present disclosure frequently refers to media capture for insurance purposes, wherein the target may comprise property with damage. Other purposes for capturing media of a target and areas of interest may be apparent to those skilled in the art.

GLOSSARY

Target: as used herein refers to the subject of media capture.
Area of Interest: as used herein refers to specific portions of the target that may be of particular significance.
Access Mechanism: as used herein refers to a mechanism that allows for viewing of captured media without requiring access or download of the captured media files. In some aspects, access mechanism may be generated based on an access request. In some embodiments, an access mechanism may be transmitted to a user as a way to request access.
Circumvention or circumvent: as used herein refers to any method or mechanism that allows for the control of native hardware without using native software. In some aspects, circumvention may comprise providing a higher priority control than the native control. In some embodiments, circumvention may comprise disabling the native software and native instruction. In some implementations, circumvention may comprise intercepting control prompts and transmitting the instructions directly to the camera. In some aspects, circumvention may be achieved through a combination of processes. Circumvention may be temporary, wherein the native software and instructions may control the hardware unless circumvention is activated. For example, circumvention may be initiated by accessing a camera functionality through the non-native application and may be terminated when the camera functionality is not active. This may allow for a return to native control even if the non-native application may be running in the background, such as to transfer the captured media.

Referring now to FIG. 1A, a portable device 100 capturing an exemplary target 110 with areas of interest 120 is illustrated. Referring now to FIG. 1B, a target with areas of interest and exemplary captured media is illustrated. In some embodiments, a portable device 100 may capture possible damage to a specific area of interest 120 on a target 110. In some implementations, the portable device 100 may be a smart device such as a tablet, smart phone, portable computer, or other media capture device, as non-limiting examples. In some aspects, the portable device 100 may comprise a media capture device such as a camera.

In some embodiments, the target 110 may comprise a piece of property, and an area of interest 120 may comprise damage to that piece of property. For example, the target 110 may be a house, car, boat, or any other non-limiting example that may be property that can be owned by a consumer. In some implementations, the area of interest 120 may be a damaged or deteriorated part of the target 110 that may need to be documented for insurance purposes.

In some aspects, the portable device 100 may have the ability to take photos and record video, such as through a camera. In some embodiments, an area of interest 120 may determine the media requirements, such as images, videos, audio, or combinations thereof. In some implementations, a user capturing the media may determine what type of media may be beneficial for the scenario. For example, a user may recognize that an area of interest 120 may comprise an active water leak and may determine that the media may need to capture video and audio to accurately capture the damage.

In some embodiments, the captured media 130 may include more than one area of interest 120 as shown in the figure. In some implementations, the target 110 may be damaged in more than one area, and each damaged portion may classify as an area of interest 120. In some aspects, the area of interest 120 may be determined by the user once a claim has been submitted. In some implementations, the user may determine what has been damaged on the target 110 and selectively capture media that focuses on an area of interest 120.

In some embodiments, a user may collect captured media 130 focused on the areas of interest 120. Once captured, the user may assess the quality of quantity of the captured media 130. In some aspects, a user may determine more images are needed and may continue to capture media of areas of interest 120. In some embodiments, some of the captured media 130 may need to be captured to effectively show an area of interest 120 so that it may be acceptable by a professional, client, or company reviewing the captured media 130. In some implementations, the captured media 130 may include more areas of interest than may be approved for compensation if captured for an insurance claim.

In some embodiments, the portable device 100 may collect media that captures the entire target 110, such as through a video or a wide-frame photograph. In some aspects, the system may analyze initial media capture for possible areas of interest 120. For example, a computer vision algorithm or programming may be installed on the portable device 100, allowing for immediate results. In some aspects, initial analysis may allow for a preliminary qualitative assessment of the media captured.

Once the media is transmitted to an external system, a deeper analysis of the media may occur, such as by using extensive computer vision algorithms that may evolve. In some aspects, a secondary user may be able to view captured media 130. The secondary user may provide feedback as to the quality and quantity of the captured media 130. In some embodiments, further analysis by one or more secondary user and programming may prompt a request to the user to capture additional media.

Referring now to FIG. 2, exemplary process steps for capturing and transmitting media is illustrated. In some embodiments, at 200, a camera may be accessed through non-native software, wherein the non-native software is configured to circumvent the native software that typically controls the camera. Utilizing non-native software may allow for custom control mechanisms uninhibited by native software constraints. In some aspects, at 210, media of the target may be captured. In some implementations, captured media may capture all of a target, portions of a target, areas of interest of a target, or combinations thereof. In some aspects, the media captured may be up to the discretion of the user and may not be limited to what can or cannot be submitted as a claim.

In some embodiments, at 220, captured media may be stored in a temporary cache. In some implementations, captured media may not be separately accessible within the portable device, wherein captured media may be viewed and deleted within the application but not edited or accessed through local memory resources. Limited access may limit risk of intentional or unintentional editing of captured media that may potentially provide an inaccurate view of the target.

In some aspects, once the media has successfully been stored in the cache it may no longer be readily edited or re-recorded. In some implementations, the temporary cache may only be accessed with a unique access mechanism. For example, the cache may require a four-digit code to access the media files recorded and stored.

In some embodiments, the cache may organize different media files in different orders such as: chronologically, alphabetically, media type, case-by-case, and other non-limiting factors. In some aspects, the temporary cache may create access mechanisms for each individual case type or file type. In some implementations, the cache may be monitored by the portable device to ensure the captured media is not deleted accidentally or through another local software. In some embodiments, the non-native software may further create an inaccessible file folder local to the portable device, wherein the file folder may be reserved to temporarily store captured media.

In some aspects, at 230, the areas of interest may be optionally identified in the captured media. In some embodiments, the observation of the areas of interest may take place in real time. For example, once the media has been captured and uploaded to the online cache it may then immediately be submitted for identification. In some implementations, a user may be able to trigger identification of areas of interest during media capture. For example, while recording, a user may speak a set of identification commands, such as "damage start" and "damage end", wherein analysis of the audio may allow for automated tagging of captured media into defined segments. As another example, a user may touch on the relevant portion of the media during capture, which may provide a reference guide to where the areas of interest may be located within the captured media.

In some embodiments, caption annotation, such as through voice capture or text entry, may be provided with each captured media. This may allow for a viewer to understand a summary or shorthand reference of the contents of the captured media, such as location, area of interest, date, time, purpose, or comments, as non-limiting examples. In some aspects, voice to text annotation may allow for live explanation of captured media that may be translated to text for easy reference.

As an illustrative example, the target may comprise a yard, and areas of interest may comprise areas that need attention from a landscaper. It may not be readily apparent from the captured media what a video of a flower bed may signify. With annotations, a user may be able to indicate that the incorrect flowers were planted or that the flower bed needs additional mulch.

In some embodiments, the media may be viewed contemporaneously via a live recording connected by two portable devices, such as through an internet connection, or Bluetooth, nearfield communication, as non-limiting examples. Contemporaneous sharing of captured media may allow for a manager, supervisor, or coworker to work on a project together. For example, multiple team members may be collecting media for a large target, such as a hospital, high rise, compound, or campus, as non-limiting examples. They may be dividing the workload to efficiently capture media of all the areas of interest. Allowing for shared media may limit the risk of overlapping capture. Manager or supervisor access to captured media may allow for real time feedback as to the quality and quantity of captured media.

In some aspects, access may be limited to other portable devices or systems that comprise the same or similar local non-native software, which may allow for a directly shared view that prevents access to captured media files. In some aspects, a second portable device may establish connection to the cache on the original portable device, which may allow for access to view the captured media. In some embodiments, a link may be transmitted that may grant temporary access to the cached captured media.

In some aspects, the observation of the media may take place post capture. For example, rather than a same day analysis the media may be stored in the online cache for longer periods of time. For example, the media may be stored in the online cache for days or weeks depending on the backlog, rather than same day or live observations. In some embodiments, the online cache may tag different media with importance levels based on severity of damage, size of damage, client, or project deadlines, as non-limiting factors, wherein duration in cache may be based at least in part of the factors.

In some embodiments, at 240, captured media may be transmitted to an external server. In some aspects, the media files may be transmitted as a data packet to the servers. In some embodiments, the data packets may be tagged with unique identifiers, which may allow for an organized storage of files in the external servers. For example, the data packets may be tagged with the sender identity, subject, receipt, date, location, or user, as non-limiting examples. In some embodiments, once the data packet has been sent from the portable device to the external server, the captured media may be deleted from the local cache folder. In some embodiments, once the file has been deleted from the local cache, the captured media may only be accessed through the external server, such as through an access mechanism.

In some aspects, at 250, the external server may generate an access mechanism 255, wherein the access mechanism 255 may allow for viewing of the captured media without requiring download of the files. In some implementations, at 260, the access mechanism 255 may be transmitted to a viewer through a communication, such as an email, text, or push notification. In some embodiments, the captured media may be viewed by clicking the access mechanism 255. In some aspects, the access mechanism 255 may comprise a URL, which may be based on the unique identifier for the captured media data packets, may be randomized, or may be manually set. In some implementations, the URL may appear in the communication as a short and logical link, and the actual URL may be a randomized ten to thirty characters.

Referring now to FIG. 3, exemplary process steps for capturing and transmitting media are illustrated. In some embodiments, at 300, a user may receive unique login information that may allow for verified access to the system. In some aspects, at 305, a user may receive target information that may include client information, location, date, purpose, target data, or areas of interest, as non-limiting examples. In some implementations, at 310, media may be captured of the target and areas of interest utilizing non-native control software.

In some embodiments, at 320, captured media may be stored in a local temporary cache. In some aspects, the media may not be readily accessible or editable once stored in the temporary cache. In some implementations, captured media may be tagged with specific information or identifiers. In some embodiments, the tags may include but are not be limited to, date, case number, alphabetically, damage type, target, areas of interest, media type, user, or client.

In some aspects, at 330, the portable device may periodically check for internet connection to access an external server. In some embodiments, at 340, tagged media may be uploaded to an external server. In some implementations, an external server may be a private server that may only be accessed by authorized personnel. In some aspects, once the media has been uploaded to the server it may be removed from the temporary cache. In some aspects, multiple videos may be stored in SQL lite during offline mode and may be transferred to an external server when there is an active internet connection. In some embodiments, reachability class may be used to observe the active internet connection and upload the captured media. In some aspect, reachability class may allow for monitoring an internet connection.

In some embodiments, multiple external servers may accept captured media. In some embodiments, captured media may be transmitted to a central external server that may collect captured media, and access to captured media may be selectively granted to predefined users. In some aspects, captured media may be tagged to transmit to a particular external server, such as a client server, insurance company server, or claims server, as non-limiting examples. In some implementations, specific servers may be designated to hold specific media types. For example, one server may hold video media files while another server may hold only picture media files.

In some aspects, at 350, a server may transmit access to the tagged media. In some embodiments, the transmitted access may comprise transmitting an access mechanism, such as a link to a website, captured media identifiers, or login information, as non-limiting examples. In some implementations, a unique access mechanism may be required to access captured media. In some embodiments, captured media may remain stored in the server, and access may be granted without transmission of actual files. For example, an access mechanism may comprise a link that would take a viewer to a website with an embedded media viewing mechanism.

Referring now to FIG. 4A, a portable device 400 capturing an exemplary target 410 with areas of interest 420 is illustrated. Referring now to FIG. 4B, a target 410 with areas of interest 420 and exemplary captured media 430 are illustrated. In some implementations, the areas of interest 420 may comprise more than one section of the target 410. For example, damage may occur throughout the target 410.

In some embodiments, a target 410 may comprise a room, garage, personal object, or piece of property, as non-limiting examples. In some aspects, the target 410 may be any object or area that has been damaged or needs attention, such as a room, yard, garage, personal object, or piece of property, as non-limiting examples. In some embodiments, the area of interest 420 may be determined by the user originally during media capture. In some implementations, areas of interest 420 may confirmed or denied by a secondary user of subsequent viewer. For example, a user may believe a portion of a house may need to be repainted, and a second user may disagree and remove that portion as an area of interest. As another example, a user may claim an area of interest 420 and submit for review, but once reviewed the area of interest 420 may no longer fit the criteria and be removed from the claims.

In some embodiments, the size of the captured media may be limited. In some aspects, a collective size of a packet of captured media may be limited, wherein captured media may be collected until a maximum file size is reached minute videos at a time. In some implementations, a user may be able to adjust the size of the temporary cache. In some embodiments, the size of the temporary cache may be the limiting factor for collection of captured media. In some aspects, downloadable software may create a separate cache from memory resources of a portable device. In some implementations, the cache may not be accessible to a user and its contents may be deleted when captured media is transferred to an external server.

In some aspects, the area of interest 420 may not be limited to a specific interest type. For example, one area of interest 420 may have water damage whereas another area of interest 420 may have some structural damage. As another example, one area of interest 420 may pertain to damage, and another area of interest 420 may pertain to work product, such as landscaping construction.

In some embodiments, the area of interest 420 may be captured in more than one media file. For example, the user may record a video of the area of interest 420 and also take a picture of the area of interest 420. In some implementations, if the area of interest 420 is larger, the user may take more than one picture to ensure the entirety of the area has been captured. In some aspects, the captured media 430 may be displayed as thumbnails or small frames of media. In some embodiments, the captured media 430 may be stored in the same media file, such as a data packet.

Figure 4C:
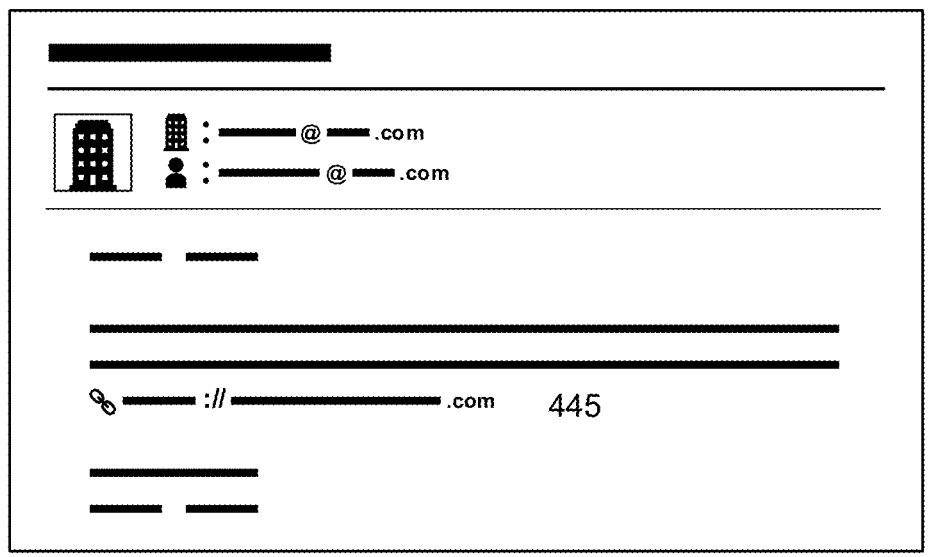
FIG. 4C illustrates an exemplary communication providing an access mechanism for viewing captured media, according to some embodiments of the present disclosure.

Referring now to FIG. 4C, an exemplary communication 440 providing an access mechanism 445 for viewing captured media is illustrated. In some embodiments, a communication 440 may be transmitted to individuals or entities who may need access to view the captured media. In some aspects, the files of the captured media may remain on an external database, wherein an access mechanism 445 may allow for viewing without requiring download of the files. In some implementations, an access mechanism 445 may comprise a randomly generated URL that may be generated per captured media or captured media packet.

In some embodiments, the access mechanism 445 may permanently associate with the captured media, allowing access at any time to anyone who may receive the communication 440. In some aspects, the access mechanism 445 may periodically randomize and refresh, wherein a new access mechanism 445 may need to be communicated. This may limit security risk of access to captured media.

Figure 4D:
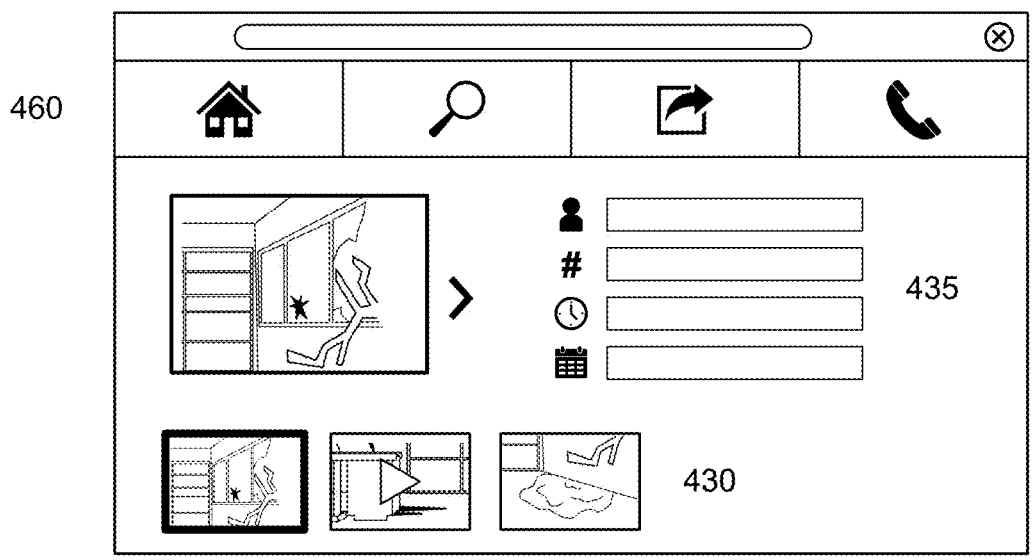
FIG. 4D illustrates an exemplary interface for viewing captured media, according to some embodiments of the present disclosure.
Figure 4E:
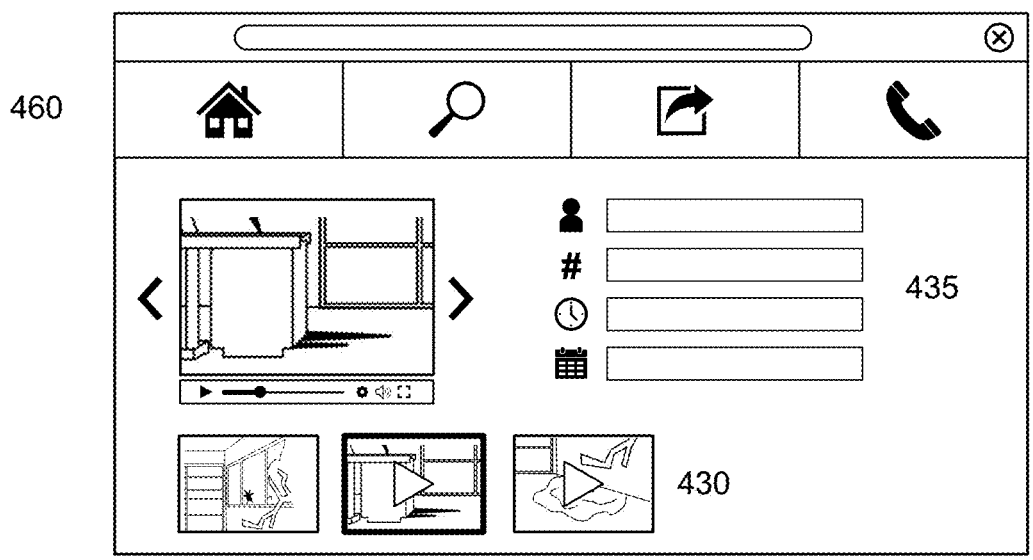
FIG. 4E illustrates an exemplary interface for viewing captured media, according to some embodiments of the present disclosure.

Referring now to FIGS. 4D-4E, an exemplary interface 450 for viewing captured media 430 is illustrated. In some aspects, an interface 450 may allow for viewing of captured media 430 without requiring downloading of files or logging in to a portal or separate application. This may streamline the process and allow for quick and easy viewing directly from the access mechanism. In some implementations, the interface 450 may comprise an embedded player that may not require a viewer to have specific software on their device. In some embodiments, the interface 450 may present the captured media 430 as thumbnails that may be independently selected for viewing.

In some implementations, captured media data 435 may be shown in conjunction with the captured media 430 when selected. The captured media data 435 may indicate who captured the media, when the media was captured, for what project the media was captured, and captured media notes, as non-limiting examples. The provided captured media data 435 may depend on who is accessing the interface 450. In some embodiments, a unique access mechanism may be generated for a client, an internal team member, and an external entity, which may allow for different interfaces 450 that provide relevant information.

As an illustrative example, a client may view a claim number, captured media for that claim, date information, cost of services, expected claim results, and notes. An external entity may not be able to view internal docket numbers, cost of services, or expected claim results, but may be able to view technical notes entered specifically for the external entity. An internal team member may be able to view all information, including information related to the user who captured the media.

In some aspects, a viewer may be able to toggle through a menu 460. In some embodiments, the tabs may allow for additional functionality within the interface 450. In some embodiments, a search function may allow a viewer to search through the captured media 430 and captured media data. In some implementations, captured media 430 may comprise one or more tags, such as indicating a specific note or characteristic of the entire capture media 430 or specific time stamps within the captured media 430. As an illustrative example, a video captured media 430 may comprise a series of tags at marker points in the video that may allow a viewer to search for the tag and jump to a specific marker within a captured media 430.

In some embodiments, an interface 450 may allow a viewer to link to external functionality, such as to call a designated person associated with the captured media 430, link to an external website, or a way to share an access mechanism to another viewer, as non-limiting examples. In some aspects, a menu 460 may not be available or may only be available to specific viewers. In some implementations, the menu 460 may be customized to the type of viewer.

Referring now to FIG. 5, exemplary process steps for capturing and transmitting media are illustrated. In some embodiments, at 500, the user may access the camera through non-native software to start the process of capturing media. In some aspects, the camera may be from a separate portable device or camera that may have media capturing capabilities. In some embodiments, at 510, media may be captured of a target. In some implementations, at 520, captured media of the target may be processed electronically. In some aspects, the processing may segment the target or segment the captured media.

In some implementations, processing may identify potential areas of interest. In some aspects, at 530, once the media has been fully recorded and processed the user may select specific media clips and edit what areas of interest may be observed or not. In some embodiments, the captured media may be divided into different clips for different areas of interest. For example, if more than one area of interest was captured on one media file the user may then divide the media file up into separate files separating the areas of interest. In some aspects, the media may be separated by data requirements or preferences, as non-limiting examples.

In some embodiments, once the media has been separated and determined adequate for submission, captured media may be temporarily stored in a local temporary cache, and at 540, may be uploaded to an external server. In some aspects, once the media is stored it may no longer be readily accessible or edited unless a unique access mechanism is provided. In some implementations, an access mechanism may be generated for each individual media file transmitted to the external server, wherein the access mechanism may be transmitted to a viewer at 550. In some aspects, the access mechanism may allow for viewing of the captured media without requiring or allowing download of files. In some embodiments, the areas of interest may be optionally identified in the file name or tag. In some aspects, the identification may be based the purpose of the media capture and how it may be intended to be used. For example, a video media capture may have a different use than a picture media capture.

In some embodiments, the media may be captured in real time or it may be a post capture media file. In some aspects, the real time analysis may occur during a live video stream, such as between the user and a secondary user or through use of computer vision or algorithms. In some implementations, a separate portable device may be used by a secondary user, such as a supervisor or manager who may want to watch the footage live. In some aspects, the analysis may occur via an audio call between the user and the observer. For example, the media captured may be streamed to the observer and then the observer may then relay their analysis to the user live through an audio call.

In some embodiments, the identification process may classify areas of interest with custom identifiers. In some aspects, the custom identifiers may distinguish specific media types from one another. In some implementations, the custom identifiers may organize the different media types or captured media packets into different folders as well. For example, a media type may be classified as a video and organized as such to make the media type easier to find.

In some aspects, the data packet may be easier to transmit than individual media clips. In some implementations, the data packet may be customized with different media types in each media packet. In some embodiments, captured media files and data packets may be individually tagged with unique codes to help sort and organize media. For example, the tags may help identify the sender, a subject, receipt, date, location, or any other non-limiting examples.

In some aspects, captured media may be collected and stored. In some embodiments, unique URLs may be associated with captured media, which may allow for easy access to viewing captured media without requiring download of files. In some implementations, URLs may be generated chronologically, wherein a portion of the URL may comprise an indication of date of capture or date of access. In some embodiments, URLs may be randomly generated, such as a 10-digit randomized alphanumeric URL.

In some aspects, the URLs may lead to a password protected page. In some embodiments, a password may be randomly generated for the viewer when the URL may be accessed. The URL and password may be associated with a particular client or company, wherein a viewer from that company may use the company password to access captured media associated with their company. In some embodiments, viewers may be limited to a predefined number or predefined list of people. This may limit the risk of access by people without permission.

In some aspects, an administration interface may allow designated personnel to manage captured media for a predefined group, such as a company, type of users (such as client, agent, or service provider), or team, as non-limiting examples. A dashboard may allow for a broader view of captured media. The dashboard may allow for control and visibility for access to captured media. In some embodiments, a dashboard may allow for sorting and organizing of captured media, such as by target, purpose, event, or client, as non-limiting examples.

Figure 6:
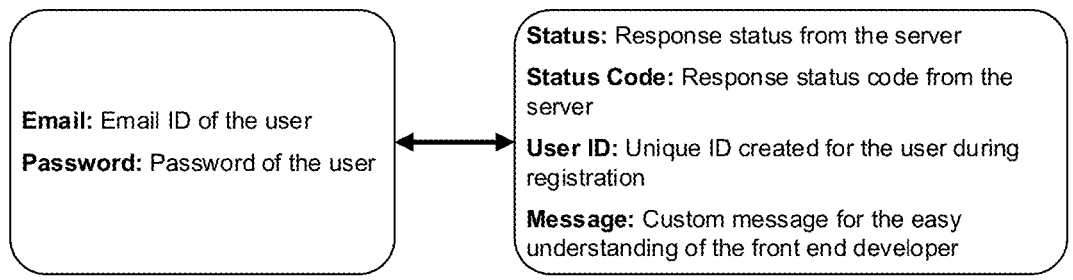
FIG. 6 illustrates exemplary process steps for triggering a monitoring status, according to some embodiments of the present disclosure.

Referring now to FIG. 6, exemplary process steps for triggering a monitoring status are illustrated. In some embodiments, the user may need to login to the system using their unique email identification. In some aspects, the email may act as their unique login email for the system. In some implementations, the system may require a unique password created by the user to help keep their account secure. In some aspects, the email and password may need to be inputted simultaneously by the user in order to login to the system.

In some embodiments, once the user has been logged into the system, they may have access to their cases status, updates, and all information regarding their case or projects. In some implementations, the status may be listed so the user is aware of where their case is along the process of it being observed. In some aspects, a status code may identify different aspects of the project. For example, a unique case code may identify the importance, classification, client, and project, as non-limiting examples. In some aspects, a unique user identification may be shown in the user profile.

In some embodiments, the user identification may help identify the particular user and their associated profile, such as their project lists. In some aspects, the user identification may help the user identify themselves to customer service or to an agent/observer when being assisted in a case. In some embodiments, a custom message may be displayed for the user. In some aspects, the message may communicate with the user more about their case. In some implementations, the message may display issues about the ongoing case and ensure the user is aware of the most up to date issues with the case. In some aspects, the message may also relay positive information about their case.

Figure 7:
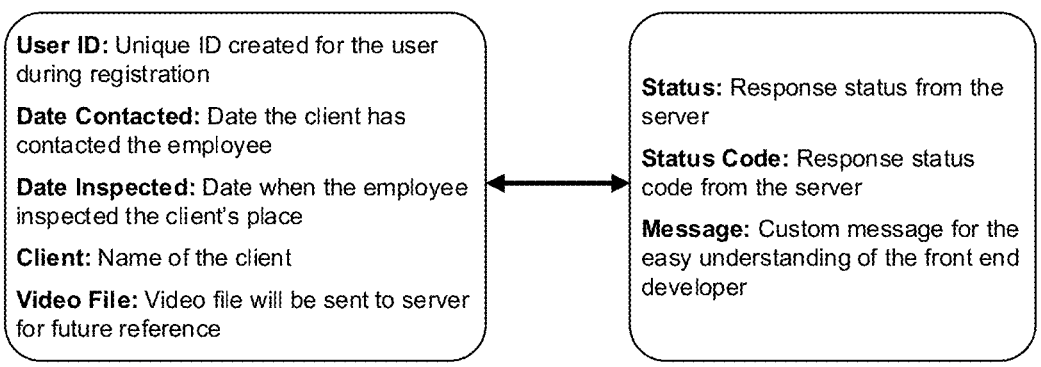
FIG. 7 illustrates exemplary process steps for labeling captured media, according to some embodiments of the present disclosure.

Referring now to FIG. 7, exemplary process steps for labeling captured media are illustrated. In some implementations, project details may be provided, including but not limited to, messages, video files, statuses, codes, inspections, or dates. In some embodiments, once the user has logged in a unique user ID that may have been created during the registration process. In some aspects, the user ID may be unique to each viewer throughout the system and help identify that viewer. In some implementations, the user ID may link all information throughout the system that involves the user to that specific ID. For example, all the cases the user has opened may directly be linked to their unique user ID, however, this may not be the only limited example.

In some aspects, the page may show updates and information about a project, client, or case, such as the last date of contact, date project initiated, or date request was received, as non-limiting examples. In some embodiments, a video file indicator may be provided, wherein the video indicator may comprise or may provide an access mechanism to view captured media, such as a link to captured media, a preview of captured media, or a message that may identify new or unviewed captured media. In some aspects, the status of the server may be displayed to inform the response of the server when in use.

Figure 8:
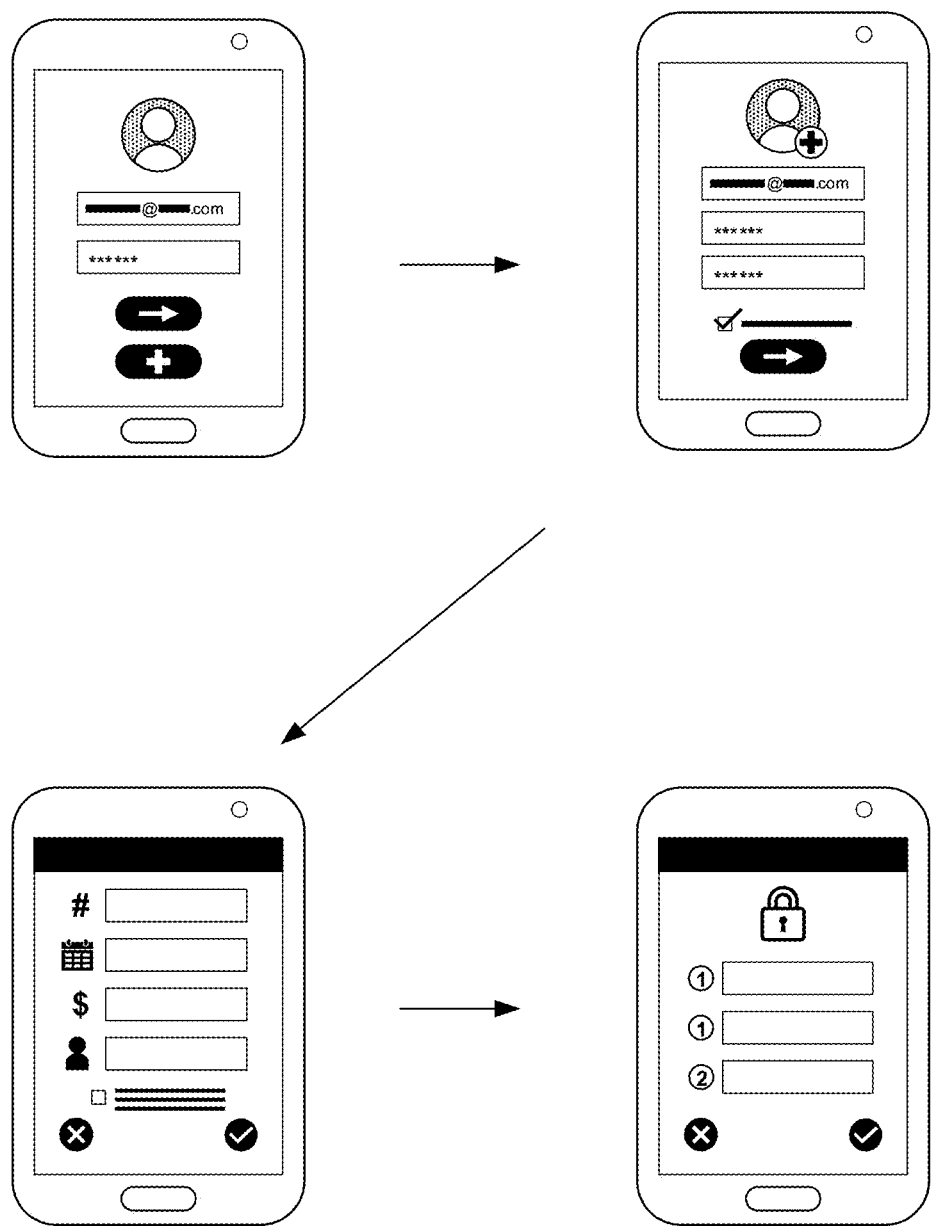
FIG. 8 illustrates exemplary graphical user interfaces for a portable device, according to some embodiments of the present disclosure.

Referring now to FIG. 8, exemplary graphical user interfaces for a portable device is illustrated. In some embodiments, a portion of the GUI may allow for open text input of information, such as notes on a captured media, description of the target, or explanation of the captured media packet, as non-limiting examples. In some aspects, some fields may comprise a drop-down menu, which may allow for more consistency and control over textual terms or nomenclature, such as client names, form names, claims names, areas of interest, or targets, as non-limiting examples.

In some embodiments, drop down menu options may be limited based on log in information. For example, once a user logs into the software application, they may only be able to select clients associated with their docket or client list. As another example, the software application may be used in conjunction with a range of services, and when a user logs in, the GUIs may be limited based on the service type associated with that log in information.

In some implementations, the user may update their profile, review action items, or review non-transmitted captured media in various GUIs. In some embodiments, an opening screen may display lines for the user to input their email(username/ID) and password. In some embodiments, a capture media page may allow the user to start capturing media and input different information regarding the media. In some embodiments, the user may input a date, such as a date of media capture, start date of project, contact date, claim date, or completion date, as non-limiting examples. In some embodiments, the user may have an option to input client or project details.

Figure 9:
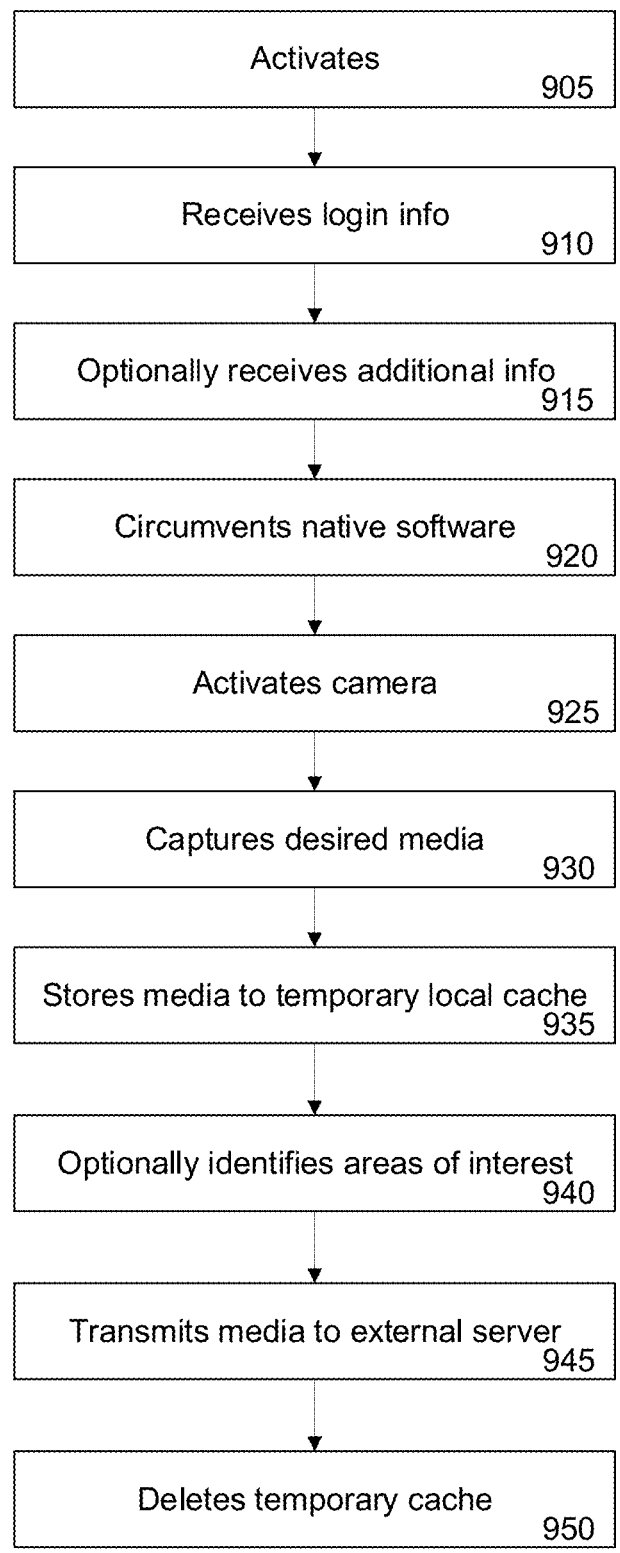
FIG. 9 illustrates exemplary method steps for utilizing non-native processes to capture media, according to some embodiments of the present disclosure.

Referring now to FIG. 9, exemplary method steps for utilizing non-native processes to capture media are illustrated. In some aspects, at 905, the system may be activated. At 910, login information may be received. At 915, in some embodiments, additional information may be received. At 920, native software may be circumvented, such as by overriding native control, suppressing native control, or suppressing transmission of control requests to native control, as non-limiting examples.

At 925, a camera may be activated. At 930, desired media may be captured. At 935, captured media may be stored temporarily to a local cache. In some aspects, as the cache fills, the captured media may be compressed, which may allow for expanded use of the memory space. In some aspects, at 940, areas of interest may be identified. At 945, captured media may be transmitted to an external server. At 950, the captured media may be deleted from the cache. In some aspects, the cache may be created on demand, based on the size of the captured media, wherein the cache may only exist when the software is active.

Figure 10:
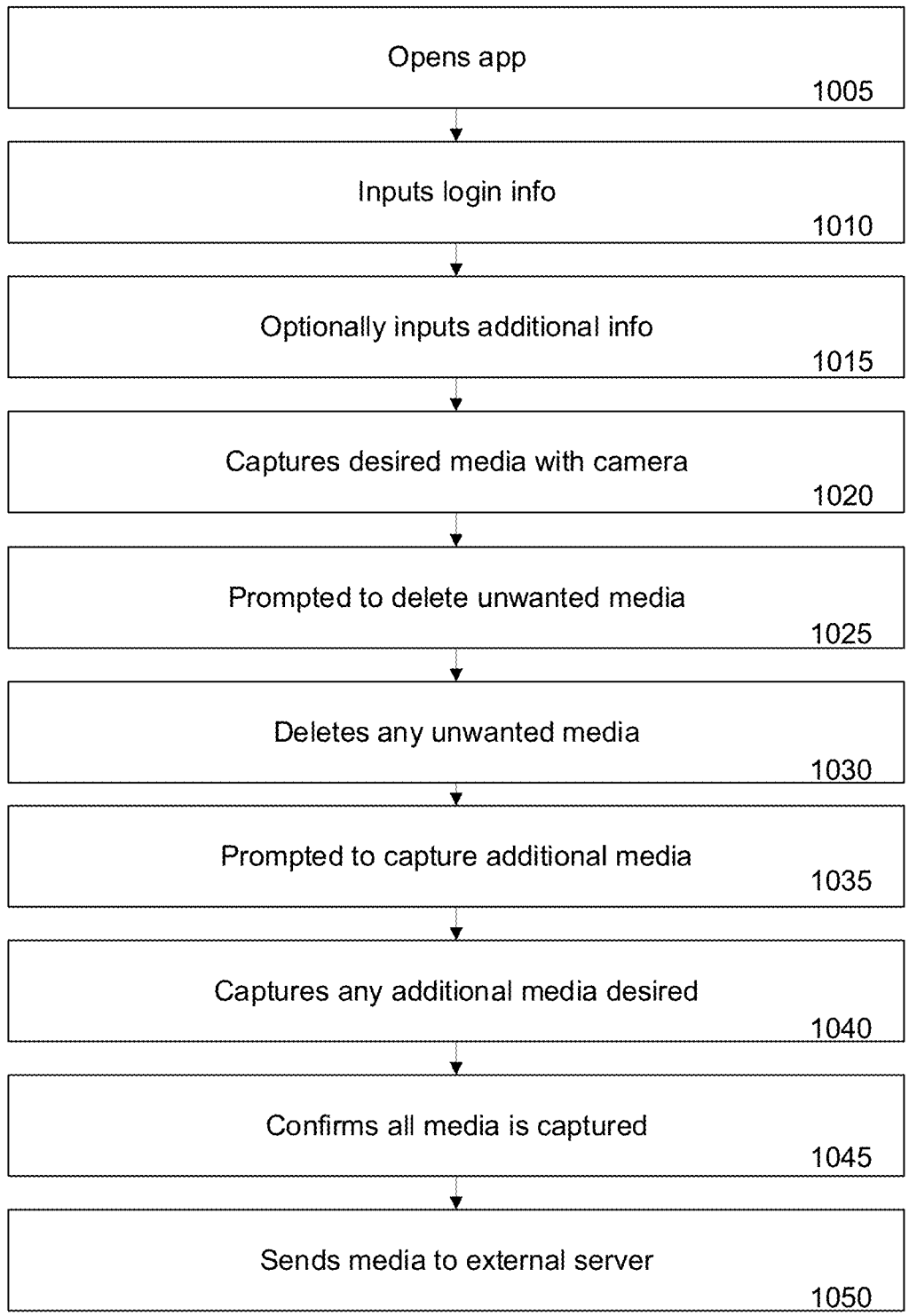
FIG. 10 illustrates exemplary method steps for capturing and transmitting captured media, according to some embodiments of the present disclosure.

Referring now to FIG. 10, exemplary method steps for capturing and transmitting captured media are illustrated. At 1005, a software application may be opened. At 1010, login information may be input. In some embodiments, at 1015, additional information may be input, such as client information, target description, or project notes, as non-limiting examples. At 1020, desired media may be captured. At 1025, an option to delete or remove unwanted captured media may be prompted. At 1030, unwanted media may be deleted, such as accidental media capture, irrelevant captured media, or low-quality captured media. At 1035, capture of additional media may be prompted. At 1040, additional media may be captured. At 1045, captured media may be confirmed as complete, such as based on a complete understanding of the target areas. At 1050, media may be sent to an external server.

Figure 11:
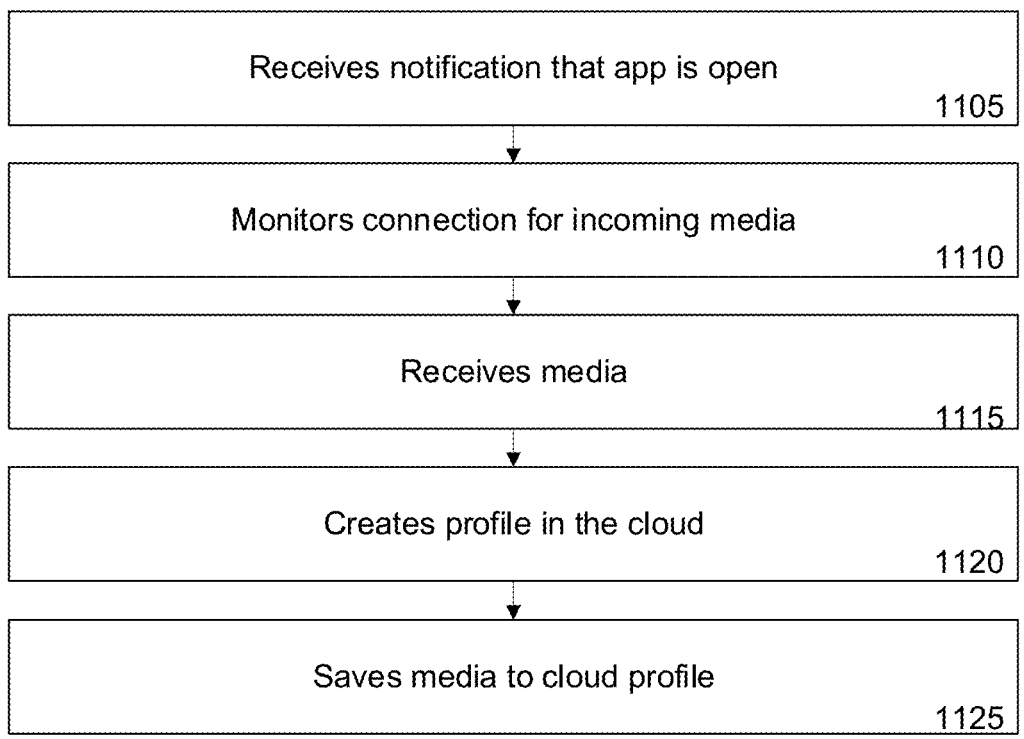
FIG. 11 illustrates exemplary method steps for monitoring and receiving captured media, according to some embodiments of the present disclosure.

Referring now to FIG. 11, exemplary method steps for monitoring and receiving captured media are illustrated. At 1105, a notification that a software application has been accessed on an external portable device may be received. At 1110, communication requests may be monitored, wherein a communication request may indicate incoming captured media. At 1115, media may be received. At 1120, a media profile may be created. At 1125, received captured media may be stored with the media profile.

Figure 12:
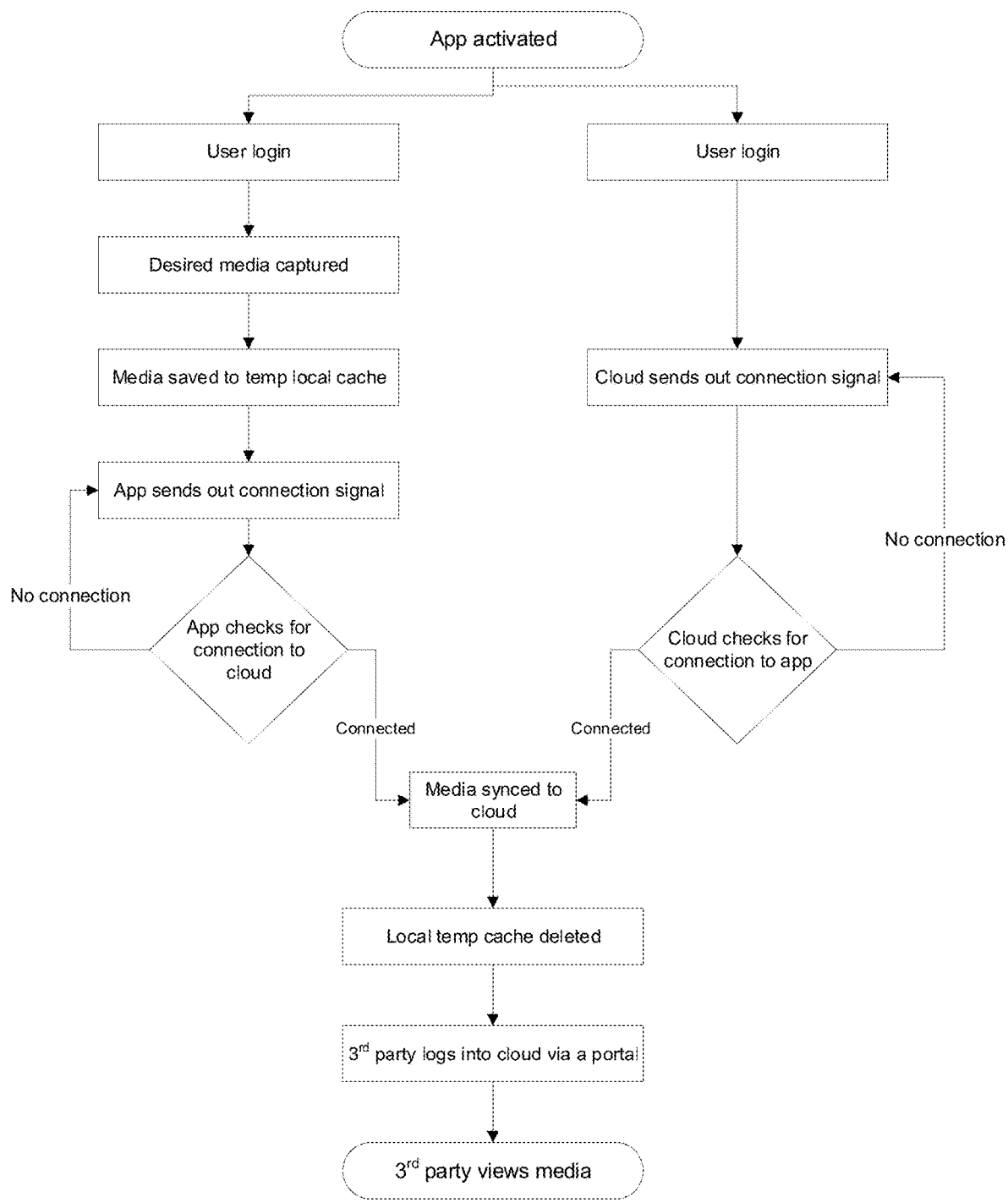
FIG. 12 illustrates an exemplary flowchart for capturing and transmitting captured media, according to some embodiments of the present disclosure.

Referring now to FIG. 12, exemplary flowchart for capturing and transmitting captured media is illustrated, wherein actions on a portable device are shown in parallel with external server actions. In some aspects, activating a software application on a portable may initiate actions in both the external server and the portable device. A user may log in to the app and capture media. In some embodiments, once the user logs into the app, and external server or cloud may send out a connection signal to the app. In some implementations, the cloud may continue to check for connection to the app until connection is established.

In some aspects, once the desired media has been captured, the captured media may be saved to a temporary online cache inside the app or within the portable device. In some embodiments, the app may send out a signal to the cloud or external server to ensure that a connection has been established before the media may be synced to the cloud. In some aspects, once connection has been established between the cloud and the app, the captured media may be synced between the two entities. In some embodiments, once the media has been synced to the cloud, it may be deleted from the temporary cache. In some aspects, a third party may log into the cloud through a portal system or link to view the captured media. In some implementations, the third party may need a unique access mechanism to view the media in the cloud.

Figure 13:
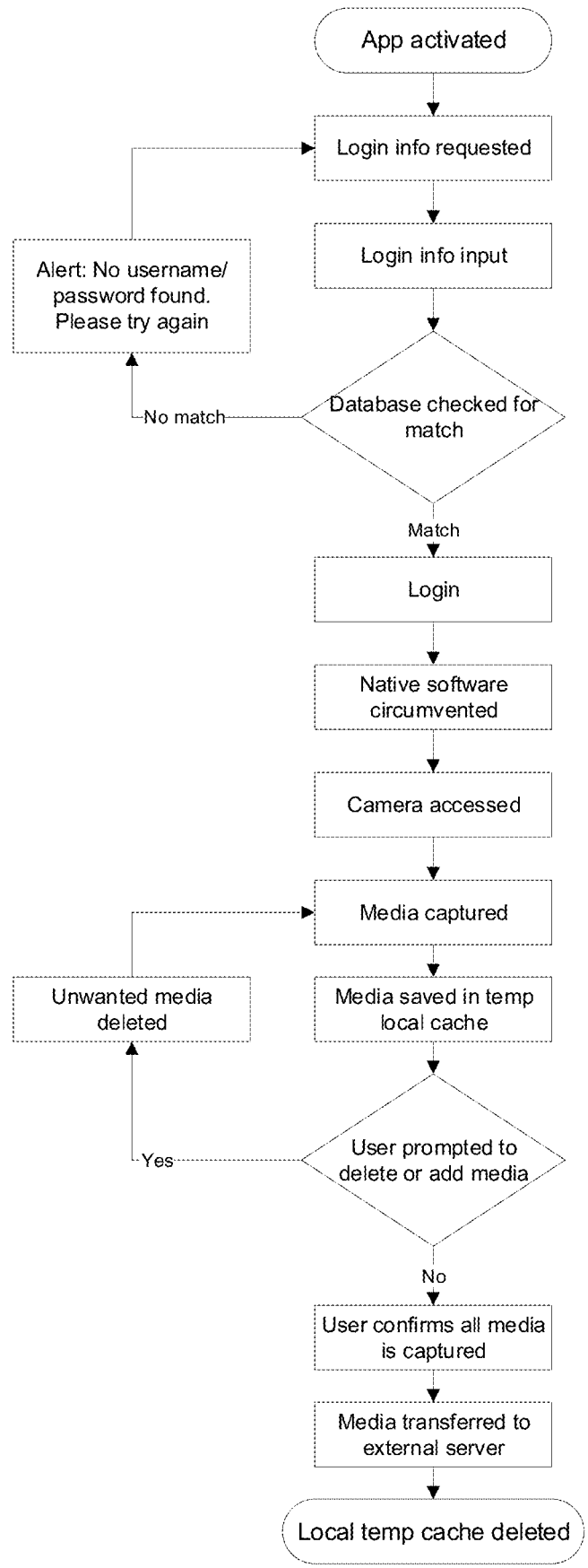
FIG. 13 illustrates an exemplary flowchart for capturing and transmitting captured media, according to some embodiments of the present disclosure.

Referring now to FIG. 13, an exemplary flowchart for capturing and transmitting captured media is illustrated. In some aspects, an application may be activated, which may request login information from the user. In some embodiments, a username or password may not be found, and the system may prompt the user to try again or create a new account if they do not have an existing one. In some implementations, the user may input their login info and the app may then check the database to find a match. Where the application may find a profile match within an external profile database, the user may be logged into the application.

In some embodiments, logging into the application may activate non-native software for controlling a local camera. In some implementations, the camera may be accessed, and the media may be captured. In some aspects, accessing the camera may prompt the non-native software to circumvent the native control software.

In some embodiments, once the media has been captured, the user may remove any unwanted media that was captured from the system. In some implementations, the user may be prompted to delete any unwanted media that was captured in the event that the user has forgotten to delete any of the captured media that does not apply to the current project. In some aspects, a captured media packet may be limited to those captured in one set, wherein exiting from application or logging out may reset the collection of media as a new project. In some embodiments, captured media packets may be collected in segments.

In some aspects, once the media has been captured and the user has ensured that all media is applicable to the case, it may be saved to the temporary online cache. Once the user confirms the media has saved and has reviewed it, the media may be transferred to an external server. In some implementations, once the captured media has been successfully transferred to the external server then it may be deleted from the temporary online cache.

Figure 14:
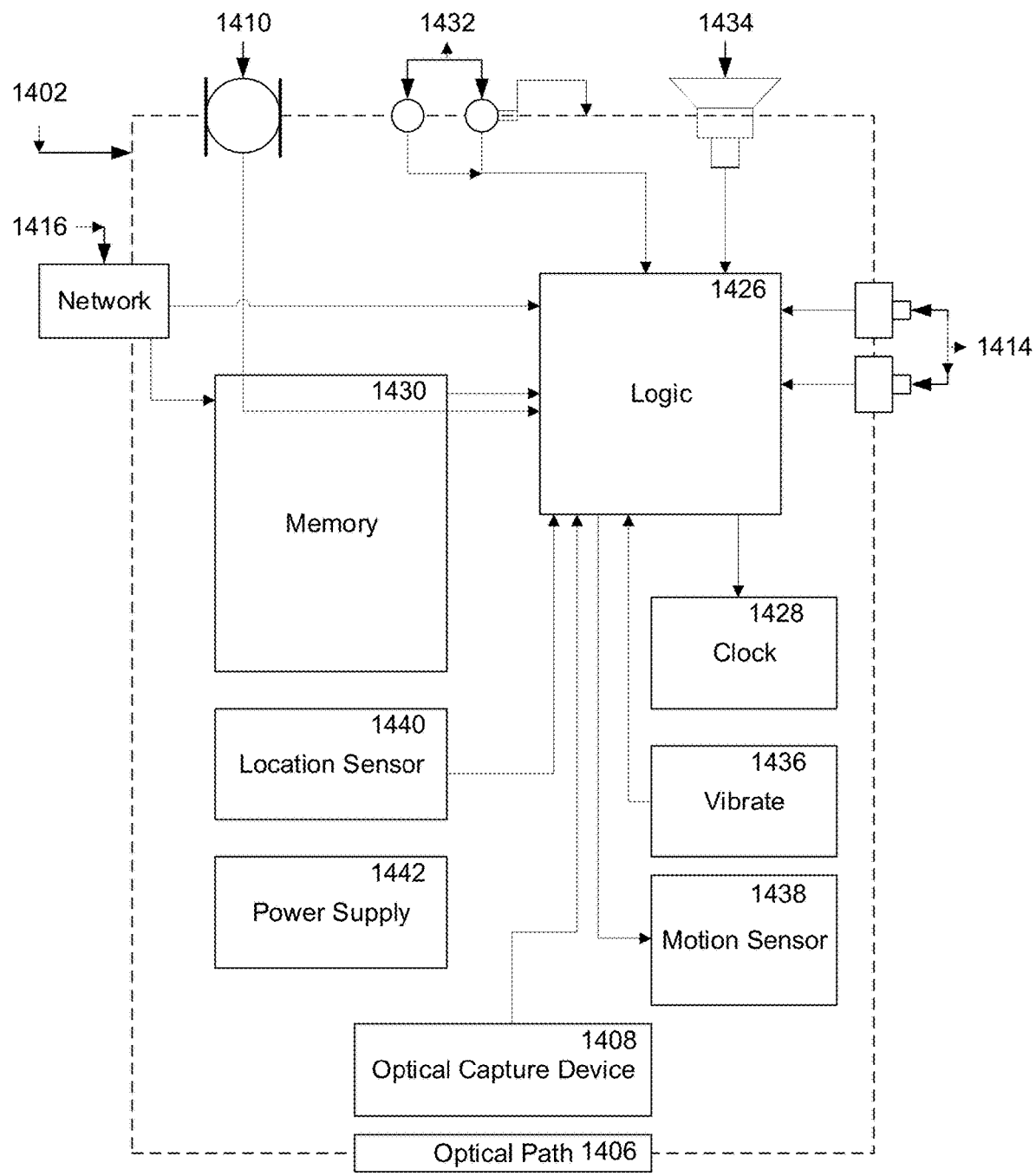
FIG. 14 illustrates an exemplary portable device, according to some embodiments of the present disclosure.

Referring now to FIG. 14, an exemplary block diagram of an exemplary embodiment of a mobile device 1402 is illustrated. The mobile device 1402 may comprise an optical capture device 1408, which may capture an image and convert it to machine-compatible data, and an optical path 1406, typically a lens, an aperture, or an image conduit to convey the image from the rendered document to the optical capture device 1408. The optical capture device 1408 may incorporate a Charge-Coupled Device (CCD), a Complementary Metal Oxide Semiconductor (CMOS) imaging device, or an optical sensor of another type.

In some embodiments, the mobile device 1402 may comprise a microphone 1410, wherein the microphone 1410 and associated circuitry may convert the sound of the environment, including spoken words, into machine-compatible signals. Input facilities 1414 may exist in the form of buttons, scroll-wheels, or other tactile sensors such as touchpads. In some embodiments, input facilities 1414 may include a touchscreen display. Visual feedback 1432 to the user may occur through a visual display, touchscreen display, or indicator lights. Audible feedback 1434 may be transmitted through a loudspeaker or other audio transducer. Tactile feedback may be provided through a vibration module 1436.

In some aspects, the mobile device 1402 may comprise a motion sensor 1438, wherein the motion sensor 1438 and associated circuitry may convert the motion of the mobile device 1402 into machine-compatible signals. For example, the motion sensor 1438 may comprise an accelerometer, which may be used to sense measurable physical acceleration, orientation, vibration, and other movements. In some embodiments, the motion sensor 1438 may comprise a gyroscope or other device to sense different motions.

In some implementations, the mobile device 1402 may comprise a location sensor 1440, wherein the location sensor 1440 and associated circuitry may be used to determine the location of the device. The location sensor 1440 may detect Global Position System (GPS) radio signals from satellites or may also use assisted GPS where the mobile device may use a cellular network to decrease the time necessary to determine location. In some embodiments, the location sensor 1440 may use radio waves to determine the distance from known radio sources such as cellular towers to determine the location of the mobile device 1402. In some embodiments these radio signals may be used in addition to and/or in conjunction with GPS.

In some aspects, the mobile device 1402 may comprise a logic module 1426, which may place the components of the mobile device 1402 into electrical and logical communication. The electrical and logical communication may allow the components to interact. Accordingly, in some embodiments, the received signals from the components may be processed into different formats and/or interpretations to allow for the logical communication. The logic module 1426 may be operable to read and write data and program instructions stored in associated storage 1430, such as RAM, ROM, flash, or other suitable memory. In some aspects, the logic module 1426 may read a time signal from the clock unit 1428. In some embodiments, the mobile device 1402 may comprise an on-board power supply 1442. In some embodiments, the mobile device 1402 may be powered from a tethered connection to another device, such as a Universal Serial Bus (USB) connection.

In some implementations, the mobile device 1402 may comprise a network interface 1416, which may allow the mobile device 1402 to communicate and/or receive data to a network and/or an associated computing device. The network interface 1416 may provide two-way data communication. For example, the network interface 1416 may operate according to an internet protocol. As another example, the network interface 1416 may comprise a local area network (LAN) card, which may allow a data communication connection to a compatible LAN. As another example, the network interface 1416 may comprise a cellular antenna and associated circuitry, which may allow the mobile device to communicate over standard wireless data communication networks. In some implementations, the network interface 1416 may comprise a Universal Serial Bus (USB) to supply power or transmit data. In some embodiments, other wireless links known to those skilled in the art may also be implemented.

Figure 15:
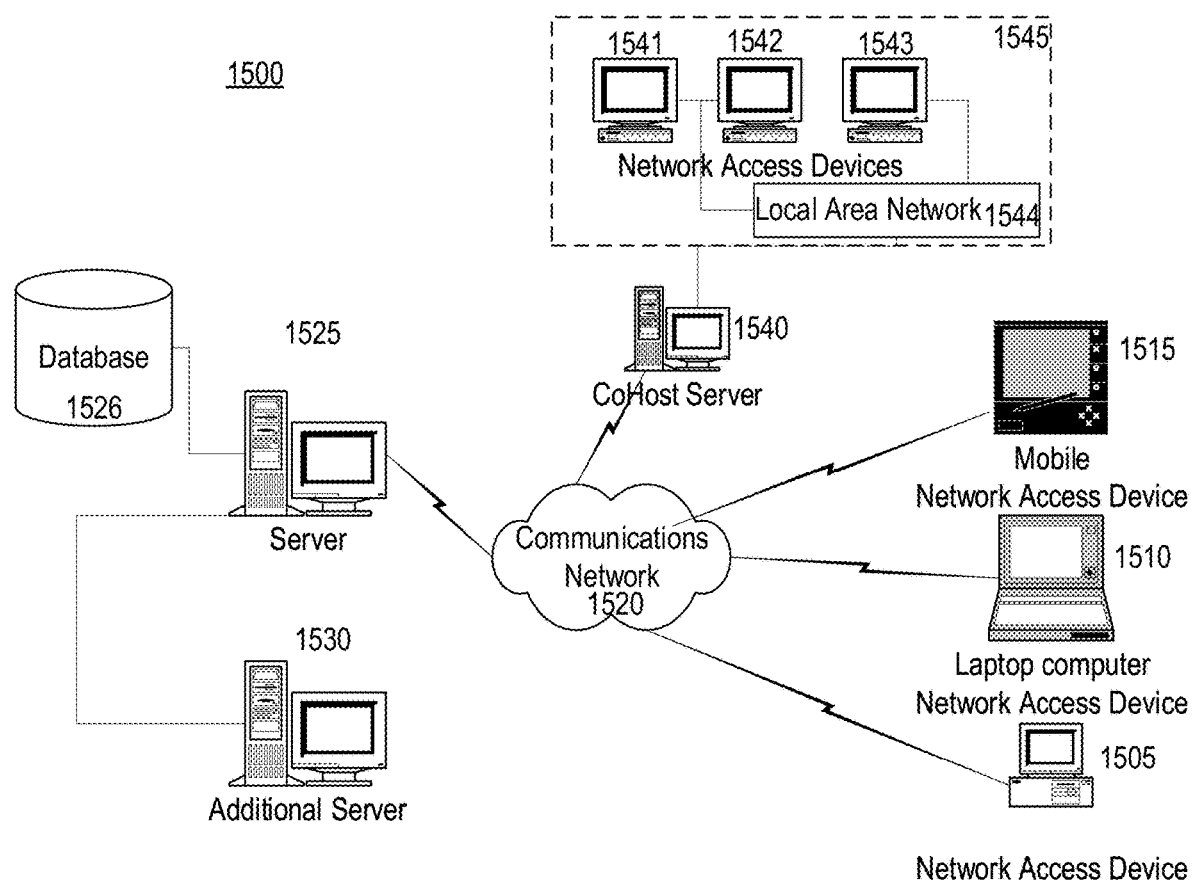
FIG. 15 illustrates an exemplary communications network, according to some embodiments of the present disclosure.

Referring now to FIG. 15, an exemplary processing and interface system 1500 is illustrated. In some aspects, access devices 1515, 1510, 1505, such as a paired portable device 1515 or laptop computer 1510 may be able to communicate with an external server 1525 though a communications network 1520. The external server 1525 may be in logical communication with a database 1526, which may comprise data related to identification information and associated profile information. In some embodiments, the server 1525 may be in logical communication with an additional server 1530, which may comprise supplemental processing capabilities.

In some aspects, the server 1525 and access devices 1505, 1510, 1515 may be able to communicate with a cohost server 1540 through a communications network 1520. The cohost server 1540 may be in logical communication with an internal network 1545 comprising network access devices 1541, 1542, 1543 and a local area network 1544. For example, the cohost server 1540 may comprise a payment service, such as PayPal or a social network, such as Facebook or a dating website.

CONCLUSION

A number of embodiments of the present disclosure have been described. While this specification contains many specific implementation details, these should not be construed as limitations on the scope of any disclosures or of what may be claimed, but rather as descriptions of features specific to particular embodiments of the present disclosure.

Certain features that are described in this specification in the context of separate embodiments can also be implemented in combination or in a single embodiment. Conversely, various features that are described in the context of a single embodiment can also be implemented in combination in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order show, or sequential order, to achieve desirable results. In certain implementations, multitasking and parallel processing may be advantageous. Nevertheless, it will be understood that various modifications may be made without departing from the spirit and scope of the claimed disclosure.

What is claimed is:

1. A system for capturing and transmitting media, the system comprising:
    a portable device comprising:
        a media capture component, wherein the media capture component is controllable by a native software stored on the portable device;
        a downloadable software to control the media capture component, wherein control of the media capture component circumvents the native software;
        a temporary cache, wherein captured media is temporarily stored in the temporary cache;
        a communications device; and
    an external server configured to receive and store captured media transmitted from the portable device, wherein the communication device monitors for communication access to the external server and transfers captured media to the external server, and wherein transferring captured media prompts deletion of captured media in the temporary cache.

2. The system of claim 1, wherein the media capture component comprises a camera.

3. The system of claim 1, wherein the downloadable software comprises a user application comprising a plurality of graphical user interfaces.

4. The system of claim 3, wherein control of the media capture component through the downloadable software is temporary.

5. The system of claim 3, wherein accessing the user application initiates control of the media capture component.

6. The system of claim 1, wherein the external server is further configured to transmit an electronic communication comprising an access mechanism that allows for viewing of the at least a portion of captured media.

7. The system of claim 6, wherein the access mechanism is randomly generated.

8. A computer-implemented method for capturing and transmitting media, the computer-implemented method comprising:
- circumventing native instructions for a media capture component of a portable device, wherein native instructions are stored locally;
- controlling the media capture component;
- capturing media through the media capture component;
- storing media in a temporary cache in the portable device;
- monitoring for communication access to an external server;
- receiving communication access to the external server;
- transmitting media to the external server; and
- removing media from the temporary cache.

9. The computer-implemented method of claim 8, wherein the media capture component comprises a camera.

10. The computer-implemented method of claim 8, wherein the temporary cache is inaccessible to a user.

11. The computer-implemented method of claim 8, further comprising:
- providing a plurality of graphical user interfaces configured to receive media capture control prompts.

12. The computer-implemented method of claim 11, wherein at least a portion of the graphical user interfaces comprises a captured media interface configured to present captured media.

13. The computer-implemented method of claim 8, further comprising:
- accessing local memory resources; and
- creating the temporary cache.

14. The computer-implemented method of claim 8, further comprising:
- generating an access mechanism that provides access to view at least a portion of media; and
- transmitting an electronic communication comprising the access mechanism.

15. The computer-implemented method of claim 14, further comprising:
- receiving an access request; and
- providing access to a viewer interface comprising a media player.

16. A computer-implemented method for providing access to captured media, the computer-implemented method comprising:
- accessing a captured media database;
- identifying one or more files storing captured media;
- generating an access mechanism for access to the captured media, wherein the access mechanism comprises a randomly generated URL;
- transmitting the access mechanism;
- receiving an access prompt through the access mechanism; and
- providing an interface comprising a viewer, wherein the viewer provides access to view captured media, wherein access to view captured media prohibits access to the one or more files.

17. The computer-implemented method of claim 16, wherein the one or more files comprise one or more tags, and wherein providing an interface comprises providing the one or more tags.

18. The computer-implemented method of claim 16, wherein the access mechanism is transmitted through a communication.

19. The computer-implemented method of claim 18, wherein the communication comprises one or more a text, email, or push notification.

* * * * *